(12) United States Patent
Ushigusa et al.

(10) Patent No.: US 8,573,247 B2
(45) Date of Patent: Nov. 5, 2013

(54) FLOW-RATE CONTROLLER, AND REGULATOR UNIT AND VALVE UNIT USED FOR THE SAME

(75) Inventors: Yoshihiro Ushigusa, Fukaya (JP); Hiroki Igarashi, Honjo (JP); Masahiro Hasunuma, Gyoda (JP)

(73) Assignee: Surpass Industry Co., Ltd., Gyoda-shi (JP)

( * ) Notice: Subject to any disclaimer, the term of this patent is extended or adjusted under 35 U.S.C. 154(b) by 750 days.

(21) Appl. No.: 11/989,503

(22) PCT Filed: Jul. 24, 2006

(86) PCT No.: PCT/JP2006/314581
§ 371 (c)(1),
(2), (4) Date: May 1, 2008

(87) PCT Pub. No.: WO2007/013403
PCT Pub. Date: Feb. 1, 2007

(65) Prior Publication Data
US 2009/0101217 A1    Apr. 23, 2009

(30) Foreign Application Priority Data
Jul. 27, 2005    (JP) .................. 2005-216822

(51) Int. Cl.
*F16K 31/04*    (2006.01)
(52) U.S. Cl.
USPC ........... 137/486; 137/487.5; 138/44; 251/331
(58) Field of Classification Search
USPC ................... 137/486, 487.5; 251/331; 138/44
See application file for complete search history.

(56) References Cited

U.S. PATENT DOCUMENTS

| | | | | |
|---|---|---|---|---|
| 4,347,733 | A | * | 9/1982 | Crain .................. 73/40.5 R |
| 5,190,068 | A | * | 3/1993 | Philbin .................. 137/8 |
| 5,411,680 | A | * | 5/1995 | McCarthy et al. .............. 261/35 |
| 5,445,035 | A | * | 8/1995 | Delajoud .................. 73/861.52 |
| 5,660,207 | A | * | 8/1997 | Mudd .................. 137/599.13 |
| 5,730,181 | A | * | 3/1998 | Doyle et al. .............. 137/487.5 |
| 5,816,285 | A | | 10/1998 | Ohmi et al. |

(Continued)

FOREIGN PATENT DOCUMENTS

| | | |
|---|---|---|
| EP | 0824232 | 2/1998 |
| JP | 2-55123 | 4/1990 |

(Continued)

OTHER PUBLICATIONS

ISA European Patent Office, Search Report of EP 06 78 1493, Apr. 23, 2010, 5 pages.

(Continued)

*Primary Examiner* — William McCalister
(74) *Attorney, Agent, or Firm* — Alleman Hall McCoy Russell & Tuttle LLP

(57) ABSTRACT

A highly versatile flow-rate controller that is easy to handle and a regulator unit and a valve unit used for the same are provided. The flow-rate controller includes a regulator unit having a regulator and a first pressure sensor, a valve unit having a second pressure sensor and a flow-rate control valve, and an orifice unit that is connected to the regulator unit and the valve unit in a detachable manner and that has a fluid channel and an orifice that connect to the regulator unit and the valve unit.

2 Claims, 23 Drawing Sheets

(56) References Cited

U.S. PATENT DOCUMENTS

| | | | |
|---|---|---|---|
| 5,819,782 A * | 10/1998 | Itafuji | 137/240 |
| 5,904,170 A * | 5/1999 | Harvey et al. | 137/9 |
| 5,918,616 A * | 7/1999 | Sanfilippo et al. | 137/1 |
| 5,975,126 A * | 11/1999 | Bump et al. | 137/487.5 |
| 5,983,933 A * | 11/1999 | Ohmi et al. | 137/597 |
| 5,992,463 A * | 11/1999 | Redemann et al. | 137/884 |
| 6,012,479 A * | 1/2000 | Fukushima et al. | 137/271 |
| 6,273,139 B1 * | 8/2001 | Ohmi et al. | 137/884 |
| 6,450,200 B1 * | 9/2002 | Ollivier | 137/624.12 |
| 6,539,968 B1 | 4/2003 | White et al. | |
| 6,648,020 B2 * | 11/2003 | Fujimoto et al. | 137/884 |
| 6,659,131 B2 * | 12/2003 | Tsourides | 137/884 |
| 6,863,088 B2 * | 3/2005 | Sugiura et al. | 138/44 |
| 7,017,609 B2 * | 3/2006 | Miwa | 137/884 |
| 2004/0204794 A1 * | 10/2004 | Ohmi et al. | 700/282 |
| 2008/0210017 A1 * | 9/2008 | Igarashi et al. | 73/861.61 |
| 2009/0101217 A1 * | 4/2009 | Ushigusa et al. | 137/511 |

FOREIGN PATENT DOCUMENTS

| | | |
|---|---|---|
| JP | 03-137417 | 6/1991 |
| JP | 09-303609 | 11/1997 |
| JP | 11-118054 | 4/1999 |
| JP | 2000-186950 | 7/2000 |
| JP | 2003-194283 | 7/2003 |
| JP | 2003-195948 | 7/2003 |

OTHER PUBLICATIONS

ISA Japan, International Search Report of PCT/JP2006/314581, Aug. 8, 2006, WIPO.

* cited by examiner

FLOW-RATE CONTROLLER, AND REGULATOR UNIT AND VALVE UNIT USED FOR THE SAME

CROSS-REFERENCE TO RELATED APPLICATIONS

This is the U.S. National Phase of International PCT Application Serial No. PCT/JP2006/314581 filed Jul. 24, 2006, which in turn claims priority to Japanese Utility Model Application No. JP 2005-216822, filed Jul. 27, 2005, both of which are hereby incorporated by reference in their entirety for all purposes.

TECHNICAL FIELD

The present invention relates to a flow-rate controller for controlling the flow rate of a fluid, to a regulator, and to a valve unit that are used for, for example, fluid transportation piping used in various industrial fields, including chemical plants, semiconductor production, food production, and biotechnology.

BACKGROUND ART

A flow-rate controller for controlling the flow rate of a fluid is constituted of a plurality of components, such as a flow meter and a flow-rate control valve. An example of such a known flow-rate controller is a flow-rate control system described in Patent Document 1, mentioned below. The components used in a flow-rate controller include, for example, a Karman vortex ultrasound flow meter, described in Patent Document 2 mentioned below, including a plurality of components and a differential-flow meter directly connected to piping, described in Patent Document 3 mentioned below, that has an integrated structure.

There is a desire for reducing the footprint of devices that use flow-rate controllers, and in association therewith, there has been an increasing desire for reducing the size of various pipe members.

Since the devices are presumed to be used for a long period of time, ease of maintenance is also desired by customers. Therefore, inevitably, there has been a desire for improving the ease of maintenance of flow-rate controllers used in such devices.

A flow-rate controller is required to be able to stabilize a specific flow to a target flow-rate value even when there is a fluctuation in pressure and flow rate on the primary and secondary sides of the valve. Moreover, when there is a change in the target flow rate, the flow-rate controller must be able to immediately respond.(See Japanese Unexamined Patent Application, Publication No. HEI-9-303609; Japanese Unexamined Patent Application, Publication No. 200-186950; Japanese Unexamined Utility Model Application, Publication No. HEI-02-55123.)

DISCLOSURE OF INVENTION

However, such a flow-rate controller having an integrated structure including many components takes up space, making the installation and maintenance complicated. For example, with the flow-rate controller, if clogging occurs because a chemical solution having low fluidity, such as slurry, is circulated, the maintenance operation becomes complicated or, in some cases, impossible.

Since the components of the flow-rate controller are integrated, the usage conditions, such as flow rate, are limited.

Even if the components of the flow-rate controller are individually provided, connection structures, such as joints, have to be provided between the components, occupying a large space.

The object of a flow-rate controller is to control the flow rate of a fluid supplied to the downstream side of a valve by controlling the degree of opening of the valve and to stably supply fluid at a constant flow rate or a variable flow rate to the downstream side (secondary side) of the valve. For such operational control of a flow-rate controller, feedback control (for example, PID control) that determines the degree of opening of the valve on the basis of the fluid pressure on the upstream side of the valve is typically used.

However, with such a flow-rate controller, when the pressure change on the upstream side (primary side) of the valve is great, control of the valve is delayed, causing problems such as the occurrence of large overshoots and increases in response time. Moreover, with such a flow-rate controller, to change the flow rate on the secondary side when there is a pressure change on the primary side, the control of the secondary side is affected by the pressure change on the primary side, and control cannot follow the change on the secondary side, causing divergence in the control. In other words, there is a problem in that, when the changes on the primary and secondary sides are to be balanced with a known flow-rate controller, the control is unsuccessful because there are too many unstable factors.

The present invention has been conceived in light of the problems described above. Accordingly, it is an object of the present invention to provide a flow-rate controller, and a regulator unit and a valve unit used for the same, whose size is optimally reduced by optimally integrating all required components, that have a minimum possibility of fluid leakage from the joint sections, and that have the utmost ease of maintenance and versatility.

It is also an object to provide a flow-rate controller, and a regulator unit and a valve unit used for the same, in which the control accuracy and response time of the flow-rate controller is improved by eliminating fluctuations on the primary side.

SUMMARY

To solve the above-described problems, the present invention provides the following solutions.

A first aspect of the present invention provides a flow-rate controller including a regulator unit having a regulator and a first pressure detection device; a valve unit having a second pressure detection device and a flow-rate control valve; and an orifice unit that is connected to the regulator unit and the valve unit in a detachable manner and that has a fluid channel and an orifice that connect to the regulator unit and the valve unit.

With the flow-rate controller having such a structure, since the components are included in three independent units, and thus, the number of components is small compared to when each of the components is provided as an independent component, the ease of handling is improved. In the flow-rate controller, compared to when each of the components is provided as an independent component, the number of joints for connecting the components is small. Consequently, the size of the entire apparatus is reduced, and the ease of handling is improved.

Since the entire flow-rate controller can be separated into three independent units that can be handled independently, the ease of handling is improved compared to when all of the components are integrated. Here, a "unit" includes a plurality of integrated components and is detachable from the other units.

In the flow-rate controller, since the orifice that requires frequent maintenance is constituted of the orifice unit that is independent from the other units, it is possible to remove only the orifice unit for maintenance, and thus the flow-rate controller is capable of maintaining excellent performance.

In the flow-rate controller, each unit can be changed to a unit having the best specification depending on the intended use. For example, by changing the orifice unit to another orifice unit whose orifice diameter differs, the flow-rate measurement range of the differential-pressure flow meter including the first pressure sensor, the orifice unit, and the second pressure sensor can be changed.

Since the flow-rate controller includes the regulator, the pressure of the fluid supplied to the first and second pressure sensors via the regulator unit is stabilized.

In other words, in the flow-rate controller, the pressure of the fluid supplied to the differential-pressure flow meter including the first and second pressure sensors and the orifice unit is stabilized. In this way, even when the pressure of the fluid supplied to the flow-rate controller fluctuates due to a turbulent flow or the like, superior feedback control based on the measurement value of the differential-pressure flow meter can be carried out.

In the flow-rate controller, the orifice unit may include a tube portion constituting the fluid channel, an orifice provided in the tube portion, a joint structure that connects an end of the tube portion to the regulator unit or the valve unit, and the joint structure and the tube portion may be integrated.

With the flow-rate controller having such a structure, in the orifice unit, since the tube portion and the joint structure are integrated, to connect the orifice unit to the regulator unit or the valve unit, a separate joint member does not have to be installed between these units, making the connection operation easy.

In the flow-rate controller, the regulator unit and the valve unit may include fixing portions for fixing to each other in a detachable manner.

With the flow-rate controller having such a structure, by fixing the regulator unit and the valve unit using the fixing portions, the regulator unit and the valve unit can be handled as a single unit, and the ease of handling is improved.

A second aspect of the present invention provides a regulator unit used in the flow-rate controller having a joint structure, the regulator unit including a regulator; a pressure detection device; a fluid channel connecting the regulator and the pressure detection device, wherein a regulator-side joint structure connecting the fluid channel and the joint structure of the orifice unit is provided as an integrated member.

With the regulator unit having such a structure, the ease of handling is improved since the regulator, the pressure detection device, the fluid channel, and the joint structure on the regulator side are integrated.

The regulator unit may include a fixing portion for fixing a device to be connected in a detachable manner.

According to this structure, since the regulator unit and the device to be connected are fixed using the fixing portion, the regulator unit and the device to be connected can be handled as a single device, and thus the ease of handling is improved.

A third aspect of the present invention provides a valve unit including, in an integrated manner: a pressure detection device; a flow-rate control valve; a fluid channel connecting the pressure detection device and the flow-rate control valve; and a valve-side joint structure connecting the fluid channel to a fluid channel of a device to be connected.

With the valve unit having such a structure, the ease of handling is improved since the pressure detection device, the flow-rate control valve, the fluid channel, and the valve-side joint structure are integrated.

With the valve unit, by connecting the flow-rate control valve to the upstream side and the second pressure sensor to the downstream side, with respect to a fluid outlet of a sealed container, the passing of excess fluid is allowed when the inner pressure of the sealed container exceeds a set pressure so that the valve unit functions as a pressure relief valve that maintains the inner pressure in the sealed container at a set pressure or lower.

The valve unit may further include a fixing portion for fixing the device to be connected in a detachable manner.

According to this structure, since the regulator unit and the device to be connected are fixed using the fixing portion, the regulator unit and the device to be connected can be handled as a single device, and thus the ease of handling is improved.

With the flow-rate controller according to the first aspect of the present invention, since the components are separated in an optimal manner, the ease of handling is improved, and versatility is improved since each unit can be changed in accordance with the intended use.

Since the flow-rate controller includes a regulator, even when the pressure of the fluid supplied to the flow-rate controller fluctuates due to a turbulent flow or the like, good feedback control based on the measurement value of the differential-pressure flow meter can be carried out.

With the regulator unit according to the second aspect of the present invention, the ease of handling is improved since the components are integrated. Moreover, the orifice unit to be connected can be selected, improving the versatility.

With the valve unit according to the third aspect of the present invention, the ease of handling is improved since the components are integrated. Moreover, the device to be connected can be selected and can be used as, for example, a pressure relief valve for a sealed container, improving the versatility.

BEST MODE FOR CARRYING OUT THE INVENTION

First Embodiment

A flow-rate controller according to a first embodiment of the present invention will be described below with reference to the drawings.

Figure 1:
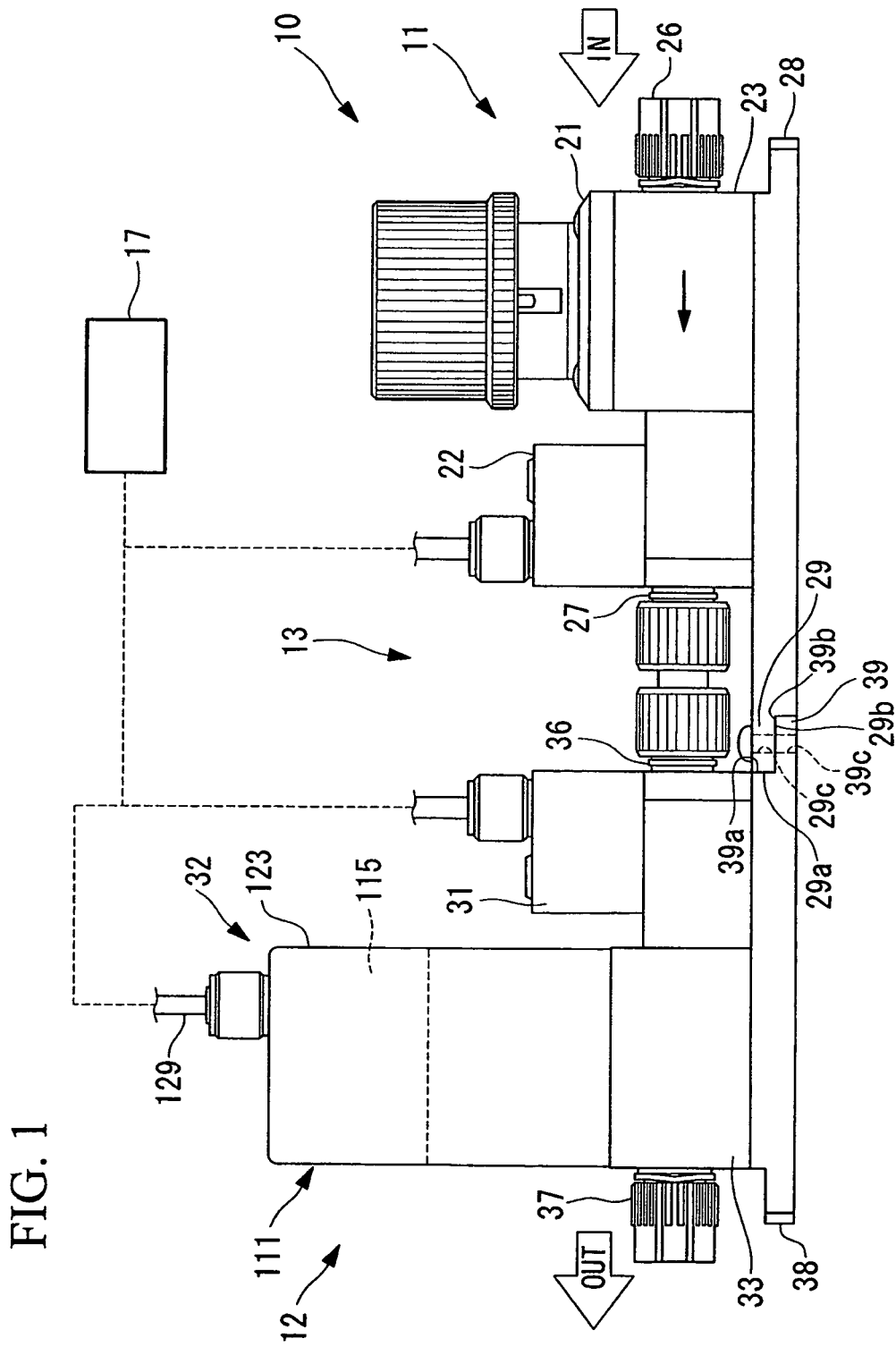
FIG. 1 is a side view illustrating a flow-rate controller according to a first embodiment of the present invention.
Figure 2:
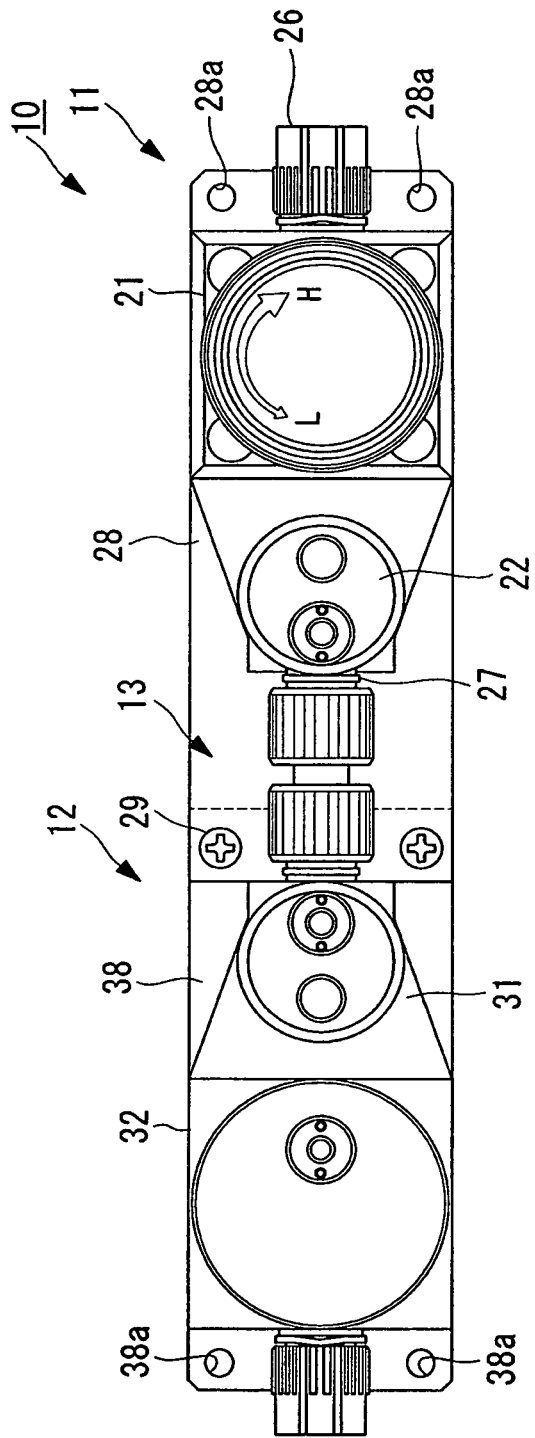
FIG. 2 is a plan view illustrating the flow-rate controller according to the first embodiment of the present invention.

As shown in FIGS. 1 and 2, a flow-rate controller 10 according to this embodiment includes a regulator unit 11 that is connected to the upstream side of a fluid transportation pipe, a valve unit 12 that is connected to the downstream side of the fluid transportation pipe, an orifice unit 13 that connects the regulator unit 11 and the valve unit 12, and a control device 17 that controls the operation of the valve unit 12.

The regulator unit 11 includes a regulator 21 for controlling the pressure of a fluid supplied from the fluid transportation pipe at a desired pressure and a first pressure sensor 22 for detecting the pressure of the liquid that has passed through the regulator 21. The regulator 21 and the first pressure sensor 22 are integrated on the same rectangular block-shaped body 23.

The body 23 includes a fluid channel (not shown) for connecting the regulator 21 and the first pressure sensor 22, a joint structure 26 for connecting the upstream side of the fluid channel and the fluid transportation pipe, and a joint structure 27 for connecting the downstream side of the fluid channel and the orifice unit 13.

The body 23 is provided on a plate-like base 28. As shown in FIG. 2, vertically penetrating bolt through-holes 28a are formed at the end portion of the upstream side of the base 28. Bolts can be passed through these bolt through-holes 28a to fix the flow-rate controller 10 to an installation object with bolts.

Figure 3:
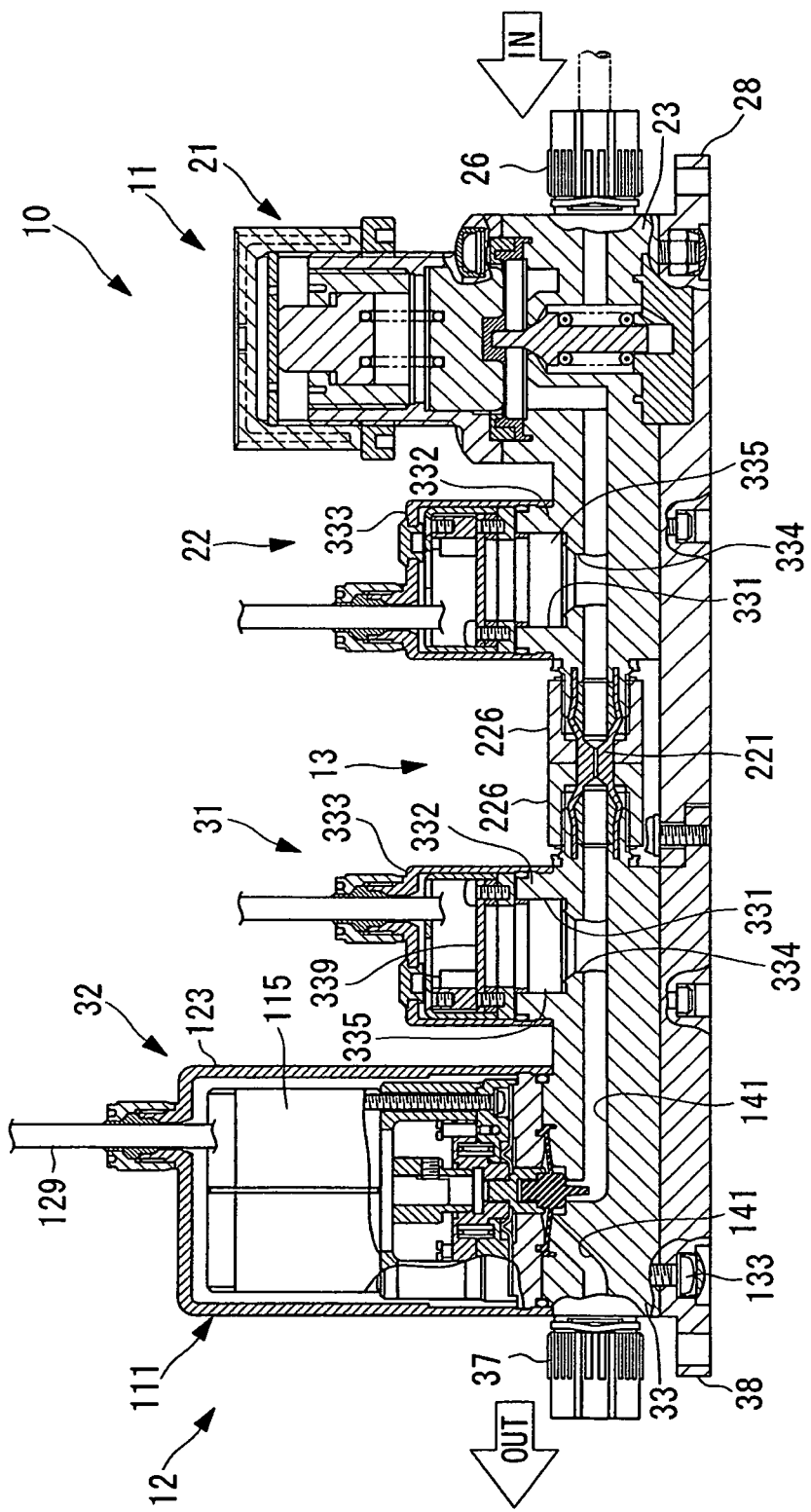
FIG. 3 is a longitudinal cross-sectional view illustrating the flow-rate controller according to the first embodiment of the present invention.
Figure 4:
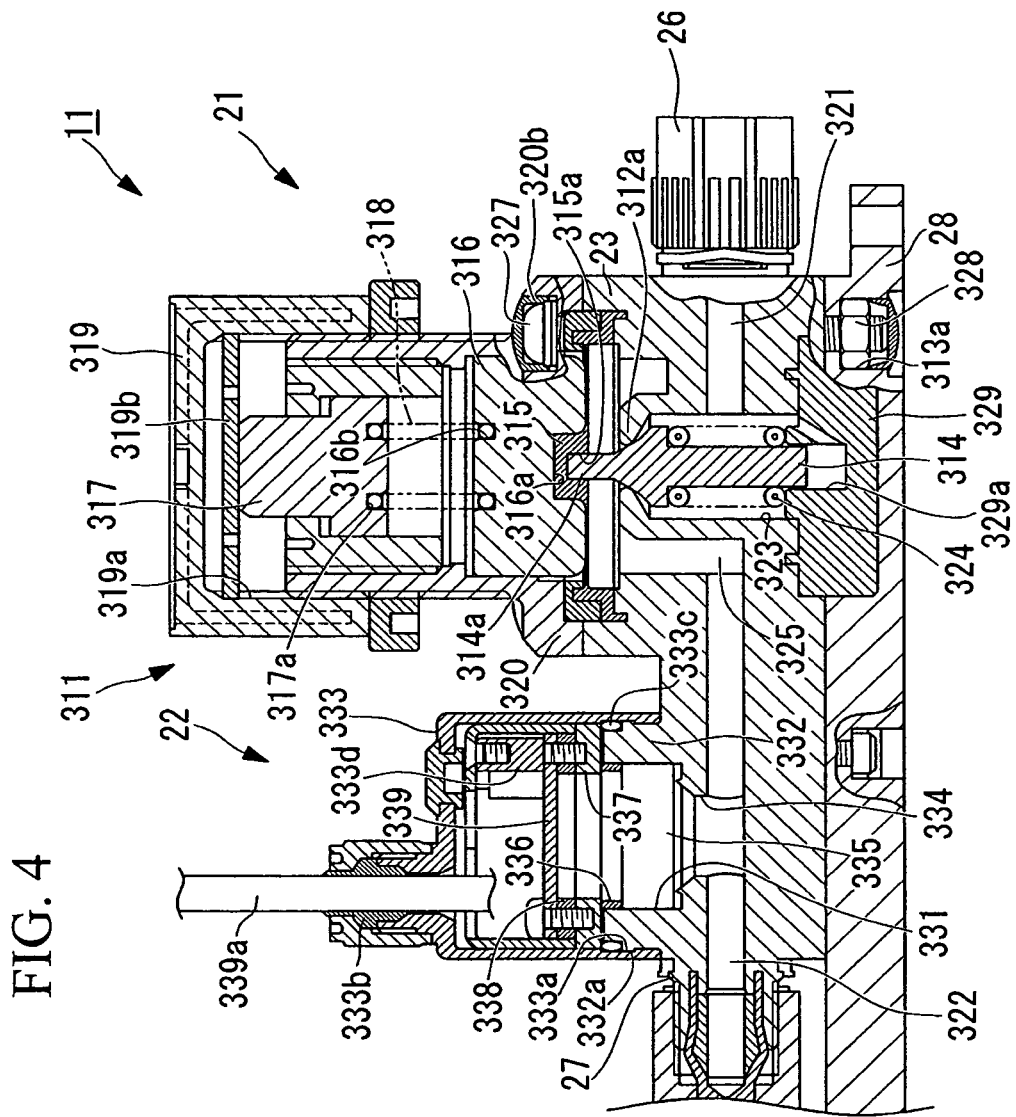
FIG. 4 is a longitudinal cross-sectional view illustrating a regulator unit of the flow-rate controller according to the first embodiment of the present invention.

As shown in FIGS. 3 and 4, the regulator 21 is mainly constituted of an operating unit 311, the body 23, the base 28, and a needle (valve element) 314.

As shown in FIG. 4, the operating unit 311 includes a diaphragm 315, a diaphragm bed 316, a plunger 317, a first spring 318, a knob 319, and a housing 320.

One side (lower surface in FIG. 4) of the diaphragm 315 is provided with a depression 315a for receiving (for engaging with) a protruding portion 314a formed on the end surface (upper end in FIG. 4) of the needle 314. The center portion of the depression 315a is capable of receiving (engaging with) a first depression 316a formed on one end (lower end in FIG. 4) of the diaphragm bed 316.

The diaphragm bed 316 is a member substantially shaped as a sideways letter U in a longitudinal cross-sectional view. One side of the diaphragm bed 316 has the first depression 316a that engages with the center portion of the diaphragm 315, whereas another side (upper side in FIG. 4) has a second depression 316b that receives (accommodates) one end (lower end in FIG. 4) of the first spring 318.

The plunger 317 is a member having a substantially inversed T shape (protruding shape) in a longitudinal cross-sectional view. One side (lower side in FIG. 4) of the plunger 317 has a depression 317a that receives (accommodates) one end (upper end in FIG. 4) of the first spring 318.

The first spring 318 is a compression coil spring interposed between the diaphragm bed 316 and the plunger 317. One end of the first spring 318 is engaged with the second depression 316b of the diaphragm bed 316, whereas the other end is engaged with the depression 317a of the plunger 317.

The knob 319 is a cylindrical member that is operated by a user to adjust the outlet-side pressure (secondary pressure) of the regulator 21. On an inner-circumferential sidewall 319a of the knob 319, a female threaded portion that engages with a male threaded portion formed on an outer-circumferential sidewall 320a of the housing 320 is provided. Then, by turning the knob 319 in one direction (for example, in the clockwise direction when FIG. 4 is viewed from above) by means of these threaded portions, the knob 319 moves toward the body 23 (in other words, downward in FIG. 4). By moving the knob 319 in the other direction (for example, in the counter-clockwise direction when FIG. 4 is viewed from above), the knob 319 moves in a direction opposite to the body 23 (in other words, upward in FIG. 4).

A knob support 319b is disposed on the inner base end (upper end in FIG. 4) of the knob 319. By turning the knob 319 in one direction, one surface thereof (lower surface in FIG. 4) pushes downwards the other end surface (upper end surface in FIG. 4) of the plunger 317.

The housing 320 accommodates the diaphragm bed 316 and the plunger 317 in a slidable manner (slidable in the vertical direction in FIG. 4) and accommodates the first spring 318. In addition, the housing 320 is configured to grasp the peripheral edge of the diaphragm 315 between the body 23 and the housing 320.

The body 23 is formed as a substantially cubic shape. The body 23 is formed of, for example, a fluorine resin material, such as PTFE (polytetrafluoroethylene), PCTFE (polychlorotrifluoroethylene), or PFA (a copolymer of tetrafluoroethylene perfluoroalkoxy vinyl ether).

A fluid inlet 321 where the joint structure 26 is provided on an end surface in the longitudinal direction (right surface in FIG. 4) of the body 23. The other surface on the opposite side of the fluid inlet 321 of the body 23 (left surface in FIG. 4) is provided with a fluid outlet 322 where the joint structure 27 is provided.

On the body 23, an inlet port 323 that extends in a direction orthogonal (vertical direction in FIG. 4) to the direction in which the fluid inlet 321 and the fluid outlet 322 extend (horizontal direction in FIG. 4) and that connects to the fluid inlet 321 is provided. A first sheet portion 312a is formed on the outlet-side end of the inlet port 323, and the needle (valve element) 314 and a second spring 324 are disposed inside the inlet port 323.

On the outside of the inlet port 323 in the radial direction (outside in the peripheral direction), an outlet port 325 is provided in a manner such as to surround the entire circumference of the first sheet portion 312a (an angle of 360 degrees). The outlet port 325 is a groove shaped as a ring in plan view and is connected to the fluid outlet 322.

Figure 5:
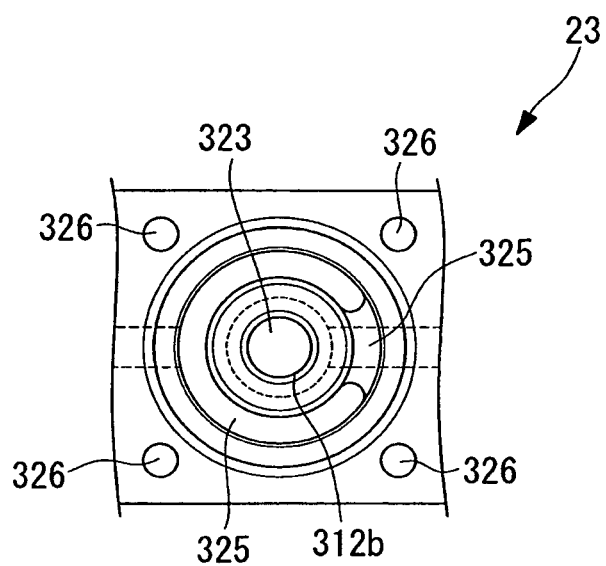
FIG. 5 is a plan view illustrating the regulator unit of the flow-rate controller according to the first embodiment of the present invention.

In FIG. 5, the reference numerals "326" represent screw holes through which fastening members, such as screws, are passed for connecting with the housing 320, the body 23, and the base 28 and which are provided near the four corners of the body 23 (in other words, on the main part of the body 23) such that they are parallel to the direction in which the inlet port 323 extends.

As shown in FIG. 4, according to this embodiment, a pan-head machine screw 327 and a hexagonal nut 328 are used as fastening members 327 and 328. A depression 320b for accommodating the head of the pan-head machine screw 327 is provided on the housing 320, whereas a depression 313a for accommodating the hexagonal nut 328 is provided on the base 28.

A needle stopper 329 is provided inside the base 28. The base 28 is a member that is disposed in contact with one surface of the body 23 (surface on the lower side in FIG. 4) together with the needle stopper 329 and that blocks the other end of the inlet port 323 (the end opposite to the outlet-side end).

A depression 329a for receiving the other end (lower end in FIG. 4) of the needle 314 in a slidable manner is formed on one end (upper end in FIG. 4) of the needle stopper 329. The second spring 324 is a compression coil spring, similar to the above-described first spring 318, and is interposed between a shoulder 14b of the needle 314 and the needle stopper 329 to urge the needle 314 toward the first sheet portion 312a.

With the regulator 21 having such a structure, when the user turns the knob 319 in one direction (in the clockwise direction in FIG. 4 as viewed from above), the knob support 319b, together with the knob 319, moves downward in FIG. 4. The downward movement of the knob support 319b causes the plunger 317 to be pushed downward. Along with this, the first spring 318 and the diaphragm bed 316 also move downward, causing the diaphragm 315 to be depressed downward, and causing the needle 314 to be moved downward against the urging force of the second spring 324. When the needle 314 is pushed downward, a gap is formed between a tapered portion (end portion) of the needle 314 and the first sheet portion 312a, causing the regulator 21 to enter an open state (open) so that the fluid flows out from the inlet side (primary side) to the outlet side (secondary side).

The control of the outlet-side pressure (secondary pressure) is carried out by balancing the force of the first spring 318 and the outlet-side pressure (secondary pressure) through the diaphragm 315.

Accordingly, when the outlet-side pressure (secondary pressure) becomes greater than the force of the first spring 318 due to an increase in the inlet-side pressure (primary pressure), the needle 314 moves upward as the diaphragm 315 moves upward. In this way, the gap between the tapered portion of the needle 314 and the first sheet portion 312a decreases (the channel is throttled), causing the outlet-side pressure (secondary pressure) to decrease.

In contrast, when the outlet-side pressure (secondary pressure) becomes smaller than the force of the first spring 318 due to a decrease in the inlet-side pressure (primary pressure), the needle 314 moves downward as the diaphragm 315 moves downward. In this way, the gap between the tapered portion of the needle 314 and the first sheet portion 312a increases (the channel is widened), causing the outlet-side pressure (secondary pressure) to increase.

In this way, the needle 314 moves upward and downward following the change in the inlet-side pressure (primary pressure) to automatically adjust the degree of opening of the regulator 21. In this way, the outlet-side pressure (secondary pressure) is maintained at a constant value.

In contrast, when the user turns the knob 319 in the other direction (in the counterclockwise direction in FIG. 4 viewed from above), the knob support 319b, together with the knob 319, moves upward in FIG. 4. The upward movement of the knob support 319b causes the plunger 317, the first spring 318, and the diaphragm bed 316 to move in the same upward direction, and causes the needle 314 and the diaphragm 315 to be pushed upward by the urging force of the second spring 324. When the needle 314 is pushed upward, the gap between the tapered portion of the needle 314 and the first sheet portion 312a is decreased, causing the regulator 21 to enter a closed state (closes) so that the flow of fluid from the inlet side (primary side) to the outlet side (secondary side) is stopped.

With the regulator 21 according to the present invention, by forming the outlet port 325 of the body 23 in a manner such that the first sheet portion 312a is surrounded or, in other words, by forming the outlet port 325 around the entire outer periphery of the first sheet portion 312a, the outlet-side end of the inlet port 323 having the first sheet portion 312a is separated from the part where the screw holes 326 are formed so that the stress generated by tightening the fastening members 327 and 328 (see FIG. 4) is not transmitted to (does not act upon) the outlet-side end of the inlet port 323. In this way, the shape of the first sheet portion 312a is constantly kept constant, regardless of the stress generated by tightening, and the tapered portion of the needle 314 can be fully and closely attached to the first sheet portion 312a.

In this way, with the regulator 21 according to this embodiment, even if the regulator 21 is assembled in an unevenly tightened manner, the shape of the first sheet portion 312a can be constantly kept at a constant shape. Accordingly, the tip (tip) of the needle 314 can be fully and closely attached to the first sheet portion 312a to prevent leaking of the fluid in a closed state.

With the regulator unit 11, when the transportation of fluid is stopped, the outlet-side pressure of the regulator 21 can be maintained at a constant pressure. In this way, even when the transportation of fluid is resumed by opening the regulator 21 and a flow-rate control valve 32 of the valve unit 12, a fluid having the same pressure as before stopping the transportation of fluid can be supplied to a point-of-use. In other words, a fluid having a constant pressure can be constantly supplied to the point-of-use.

The first pressure sensor 22 is not limited so long as it is capable of detecting the fluid pressure. However, it is preferable that the first pressure sensor 22 be, for example, a piezoelectric pressure sensor, a capacitance pressure sensor, or a strain gauge pressure sensor.

In this embodiment, a strain gauge pressure sensor is used as the first pressure sensor 22. The structure of the first pressure sensor 22 will be described in detail below.

As shown in FIG. 4, a sensor-holding depression 331 whose inner sidewall has as a substantially cylindrical shape downstream of the regulator 21 on the upper surface of the body 23 and an annular projection 332 that surrounds the sensor-holding depression 331 are provided on the upper surface of the body 23. A male threaded portion 332a is provided on the outer circumferential surface of the annular projection 332.

A hollow cylindrical cover 333 having an opening through which the annular projection 332 is passed on the lower surface is provided on the upper portion of the annular projection 332. A female threaded portion 333a is provided on the lower-end inner surface of the cover 333. By engaging the female threaded portion 333a with the male threaded portion 332a of the annular projection 332, the cover 333 is fixed on the upper surface of the body 23 such that it is concentric with the annular projection 332.

The components of the first pressure sensor 22 are stored in the space enclosed by the sensor-holding depression 331 and the cover 333.

A cable 339a that connects a control substrate 339, described below, and the control device 17 is passed through the roof of the cover 333.

Cable packing 333b is interposed between the cover 333 and the cable 339a, and an O-ring 333c is interposed between the cover 333 and the annular projection 332. The cable packing 333b and the O-ring 333c are made of, for example, fluororubber (FKM).

A port 334 that is connected to a section of the channel formed in the body 23, between the outlet port 325 and the annular projection 332, is provided on the bottom surface of the sensor-holding depression 331. This port 334 has a diameter smaller than that of the sensor-holding depression 331.

A main body of the sensor 335 that is shaped as a disk having the same diameter as that of the sensor-holding depression 331 is disposed inside the sensor-holding depression 331 in a manner such that it is concentric with the sensor-holding depression 331. The main body of the sensor 335 is disposed inside the port 334 such that a pressure-receiving surface thereof is exposed. The main body of the sensor 335 and the inner surface of the port 334 are sealed in an airtight, liquid-tight manner.

An annular spacer ring 336 is provided on the main body of the sensor 335 inside the sensor-holding depression 331 in a manner such that it is concentric with the main body of the sensor 335. The height of the upper surface of the spacer ring 336 is the same as that of the upper surface of the annular projection 332.

A disk-like sensor plate 337 having a diameter smaller than that of the male threaded portion 332a of the annular projection 332 is provided at the upper section of the annular projection 332 in a manner such that it is concentric with the annular projection 332. The sensor plate 337 is provided in contact with both the annular projection 332 and the spacer ring 336 so as to fix the annular projection 332 and the spacer ring 336 such that their upper surfaces are at the same height.

An annular spacer 338 is provided on the upper surface of the sensor plate 337 in a manner such that it is concentric with the sensor plate 337. The control substrate 339 connected to the main body of the sensor 335 via wiring not shown and for controlling the operation of the main body of the sensor 335 is provided on the annular spacer 338.

The control substrate 339 is fixed to the sensor plate 337 with screws in a manner such that it is substantially parallel to the sensor plate 337 (in other words, in a substantially horizontal manner).

In this embodiment, the control substrate 339 is substantially disk-shaped. In this way, the control substrate 339 ensures a sufficient mounting area for an electronic circuit while keeping the size small enough to be stored substantially horizontally in the cover 333.

In other words, the length in the vertical direction of the first pressure sensor 22 of the control substrate 339 is kept to approximately the sum of the thickness of the control substrate 339 and the height of the electronic components mounted on the control substrate 339. In this way, the length in the height direction of the first pressure sensor 22 is minimized.

The cable 339a connected to the control device 17 is provided on the upper surface of the control substrate 339. The cable 339a, as described above, is led outside the cover 333 through the roof of the cover 333.

A spacer 333d is interposed between the upper surface of the control substrate 339 and the lower surface of the roof of the cover 333. In this way, when the cover 333 is attached to the annular projection 332, the control substrate 339 is gripped and fixed between the spacer 333d and the spacer 338.

As shown in FIG. 1, a fixing portion 29 that fixes the valve unit 12 in a detachable manner is provided on the downstream-side end of the body 23.

The fixing portion 29 has a shape that engages with the shape of the portion of the valve unit 12 to be fixed. In this embodiment, the fixing portion 29 is a block shape that protrudes downward substantially horizontally and that is provided on the upper end surface on the downstream side of the plate-like base 28. The end surface on the downstream side of the fixing portion 29 comprises a first alignment surface 29a, and the lower surface of the fixing portion 29 comprises a second alignment surface 29b. As shown in FIG. 2, a bolt through-hole 29c penetrating vertically is provided in the fixing portion 29. The fixing portion 29 can be fixed with bolts to the portion of the valve unit 12 to be fixed by passing a bolt through the bolt through-hole 29c.

As shown in FIGS. 1 and 2, the valve unit 12 includes a second pressure sensor 31 for measuring the pressure of a fluid supplied from the regulator unit 11 via the orifice unit 13 and a flow-rate control valve 32 for controlling the flow rate of the fluid that has passed through the second pressure sensor 31. The second pressure sensor 31 and the flow-rate control valve 32 are integrated and provided on the same block-shaped body 33.

The second pressure sensor 31 employed here is not limited so long as it is capable of detecting fluid pressure. However, it is preferable that the second pressure sensor 31 be, for example, a piezoelectric pressure sensor, a capacitance pressure sensor, or a strain gauge pressure sensor.

In this embodiment, the structure of the second pressure sensor 31 and its attachment structure to the valve unit 12 are the same as the structure and attachment structure of the first pressure sensor 22 of the regulator unit 11.

The body 33 includes a fluid channel 141 connecting the second pressure sensor 31 and the flow-rate control valve 32 (see FIG. 6), a joint structure 36 connecting the upstream side of the fluid channel 141 and the orifice unit 13, and a joint structure 37 connecting the downstream side of the fluid channel 141 and the fluid transportation pipe.

The body 33 is provided on a plate-shaped base 38. As shown in FIG. 2, vertically penetrating bolt through-holes 38a are formed at the end portion of the downstream side of the base 38. Bolts can be passed through these bolt through-holes 38a to fix the flow-rate controller 10 to an installation object with bolts.

As shown in FIG. 1, a fixing portion 39 that fixes the regulator unit 11 in a detachable manner is provided on the end portion at the upstream side of the body 33.

The fixing portion 39 has a shape that engages with the shape of the fixing portion 29 of the regulator unit 11. In this embodiment, the fixing portion 39 has a rectangular cutout, on the upper end surface on the upstream side of the plate-like base 38, that receives the fixing portion 29 of the regulator unit 11.

The surface of the inner surfaces of the cutout that faces the upstream side comprises a first alignment surface 39a that receives the first alignment surface 29a of the fixing portion 29 of the regulator unit 11, and the surface that faces upward comprises a second alignment surface 39b that receives the second alignment surface 29b of the fixing portion 29 of the regulator unit 11. A threaded hole 39c is formed in the fixing portion 39 at a position facing the bolt through-hole 29c of the fixing portion 29 when the first alignment surfaces and the second alignment surfaces of the fixing portion 39 and the fixing portion 29 are in surface contact. The fixing portion 29 and the fixing portion 39 can be fixed by engaging the bolt passing through the bolt through-hole 29c with the threaded hole 39c.

Figure 6:
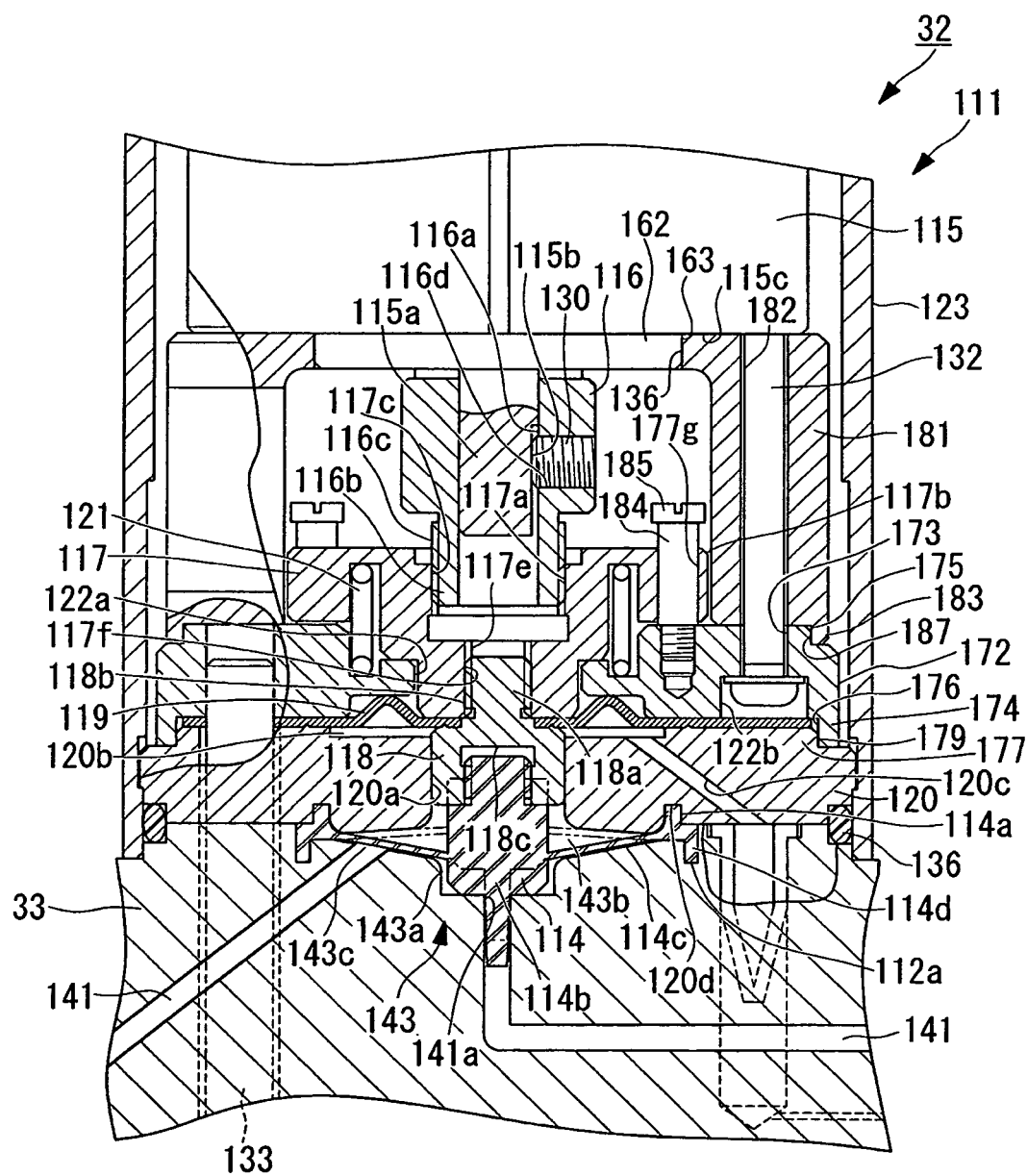
FIG. 6 is a longitudinal cross-sectional view illustrating a valve unit of the flow-rate controller according to the first embodiment of the present invention.

As shown in FIG. 6, the flow-rate control valve 110 is constituted mainly of a driving unit 111, the body 33, the base 38 (see FIG. 1), and a diaphragm needle (valve element) 114.

The driving unit 111 includes a motor 115, a coupling 116, a slider 117, a stopper 118, packing 119, a diaphragm cover 120, a spring (urging member) 121, a cover flange 122, and a cover 123 (see FIG. 1).

The motor 115, for example, comprises a stepping motor. At the center portion of the lower surface of this motor 115, a rotary shaft 115a that protrudes downward and rotates forward and backward by electrical power supplied via a cable 129 (see FIG. 1) is provided. A flat seating surface 115b is provided on part of the rotary shaft 115a. This seating surface 115b contacts the end surface of a hexagon-socket set screw 130, which is described below.

Figure 7:
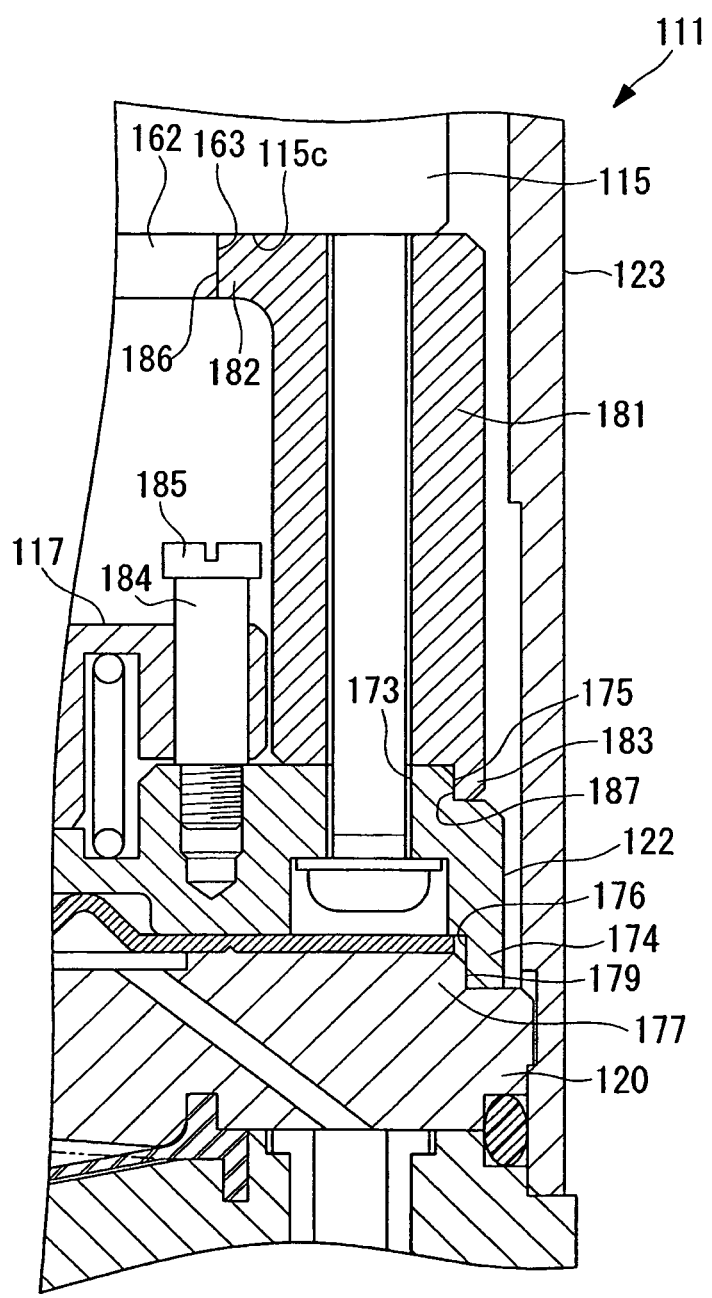
FIG. 7 is an enlarged view of FIG. 6.

In this embodiment, as shown in FIGS. 6 and 7, a cylindrical portion 162 that is concentric with the rotary shaft 115a and that protrudes downward from a lower surface 115c is provided at the lower edge of the motor 115, and the outer circumferential surface of the cylindrical portion 162 comprises a first alignment reference surface 163. The lower surface 115c of the motor 115 is a flat surface that is substantially orthogonal to the rotary shaft 115a.

A substantially cylindrical housing 181 is provided at the lower edge of the motor 115.

The rotary shaft 115a of the motor 115 is passed through the housing 181.

An inner flange 182 in which the cylindrical portion 162 of the motor 115 is inserted is provided at the upper edge of the housing 181. A ring-shaped protrusion 183 protruding downward from the lower edge surface is provided at the lower edge of the housing 181. In this embodiment, the inner flange 182 and the protrusion 183 are concentric with the axis of the housing 181.

The inner circumferential surface of the inner flange 182 is shaped as a cylindrical inner surface that has an inner diameter substantially the same as the outer diameter of the cylindrical portion 162 of the motor 115. This inner circumferential surface comprises a first alignment surface 186 that receives the first alignment reference surface 163 of the motor 115 to concentrically align the motor 115 with the axis of the inner flange 182.

The inner circumferential surface of the protrusion 183 comprises a second alignment reference surface 187 that is shaped as a cylindrical inner surface concentric with the first alignment surface 186.

As shown in FIG. 6, the coupling 116 is a cylindrical member having a substantially T-shaped cross-section. Its center portion is provided with a depressed portion 116a for receiving the rotary shaft 115a, and a protruding portion 116b protrudes downward from the lower end portion. A male threaded portion 116c is formed on the outer surface of the protruding portion 116b and engages with a female threaded portion 117a, described below, of the slider 117.

On the sidewall constituting the depressed portion 116a of the coupling 116, a through-hole 116d for receiving the hexagon-socket set screw 130 is formed. A female threaded portion that engages with the male threaded portion formed on the surface of the hexagon-socket set screw 130 is provided on the surface of this through-hole 116d. The hexagon-socket set screw 130 is screwed into the through-hole 116d so that the male threaded portion of the hexagon-socket set screw 130 engages with the female threaded portion of the through-hole 116d and the end surface of the hexagon-socket set screw 130 contacts the seating surface 115b of the rotary shaft 115a. In this way, the coupling 116 is fixed to the rotary shaft 115a of the motor 115 by screwing the hexagon-socket set screw 130 into the through-hole 116d.

The slider 117 moves up and down inside the substantially cylindrical housing 181 provided at the lower edge of the motor 115. On both end sections (right and left end sections in the drawing) 117b of the slider 117, a through-hole having an inner circumferential surface contacting the outer circumferential surface of a guide pin 184, described below, is provided in the vertical direction.

As shown in FIGS. 6 and 7, a first depressed portion 117c for receiving the protruding portion 116b of the coupling 116 is provided at the upper center portion of the slider 117. The female threaded portion 117a that engages with the male threaded portion 116c of the protruding portion 116b is provided on the surface of the depressed portion 117c.

A second depressed portion 117e for receiving a protruding portion 118a of the stopper 118 is provided at the lower center portion of the slider 117. A female threaded portion 117f that engages with a male threaded portion 118b of the protruding portion 118a is provided on the surface of the second depressed portion 117e.

The slider 117 having such a structure moves up and down inside the housing 181 by means of the coupling 116, which rotates together with the rotary shaft 115a of the motor 115.

The stopper 118 is a cylindrical member having a substantially T-shaped cross-section. Its center portion is provided with a depressed portion 118c for receiving the center portion of the diaphragm needle 114, and the protruding portion 118a protrudes upward from the upper end portion of the stopper 118. The male threaded portion 118b that engages with the female threaded portion 117f of the slider 117 is provided on the outer surface of the protruding portion 118a.

In other words, the stopper 118 is fixed to the slider 117 by screwing the protruding portion 118a into the second depressed portion 117e of the slider 117 and moves up and down together with the slider 117.

When the protruding portion 118a of the stopper 118 is screwed into the second depressed portion 117e of the slider 117, the inner circumferential edge of the packing 119 is gripped between the stopper 118 and the slider 117.

The packing 119 is a donut-shaped member in plan view, and a circular hole through which the protruding portion 118a of the stopper 118 passes is provided at the center portion. The packing 119 is formed of, for example, fluororubber (FKM). The inner circumferential edge of this packing 119 is interposed between the stopper 118 and the slider 117 and is fixed by its outer circumferential edge being interposed between the diaphragm cover 120 and the cover flange 122.

The diaphragm cover 120 and the cover flange 122 are fixed to the body 33 and the base 38 with a pan-head machine screw 133.

The diaphragm cover 120 has a through-hole 120a that guides the outer circumferential surface of the sidewall forming the depressed portion 118c of the stopper 118 at the center portion, a depressed portion 120b at the center portion of the upper surface, and a communication channel 120c that connects the upper surface and the lower surface.

A groove 120d that accommodates a ring-shaped protruding portion 114a formed upward from the outer circumferential edge of the diaphragm needle 114 is provided on the lower surface of the diaphragm cover 120.

On the upper surface of the diaphragm cover 120, a cylindrical portion 177 protruding upward is provided concentrically with the through-hole 120a.

The cylindrical portion 177 is inserted on the inner circumferential side of the protrusion 174, described below, of the cover flange 122. The outer circumferential surface of the cylindrical portion 177 comprises a cylindrical surface having a diameter substantially the same as the inner diameter of the protrusion 174 of the cover flange 122. This outer circumferential surface comprises a third alignment surface 179 that receives a third alignment reference surface 176, described below, of the cover flange 122 to align the cover flange 122 concentrically with the through-hole 120a.

On the upper surface of the diaphragm cover 120, the ring-shaped portion located on the outer circumferential side of the cylindrical portion 177 is a flat surface substantially orthogonal to the through-hole 120a.

The outer circumferential surface of the diaphragm cover 120 is received by the inner surface of the cover 123 installed on the body 33, and the through-hole 120a is aligned concentrically with the diaphragm needle 114.

The spring 121 is a compression coil spring that is interposed between the slider 117 and the cover flange 122 and that constantly urges the slider 117 upward (toward the motor 115). The spring 121 reduces (or eliminates) backlash between the female threaded portion 117a of the slider 117 and the male threaded portion 116c of the coupling 116. According to this structure, since the direction of the force of the fluid passing through the port 143 acting upon the diaphragm needle 114 and the direction in which the spring 121 urges the slider 117 match, the change in the amount of backlash of the female threaded portion 117a and the male threaded portion 116c caused by the pressure difference of the fluid can be substantially eliminated. Therefore, the difference in flow rate due to opening and closing the valve, in other words, hysteresis in the flow rate, can be substantially eliminated.

The cover flange 122 has a through-hole 122a that guides the outer circumferential surface of the sidewall forming the first depressed portion 117c of the slider 117 at the center portion and is structured such that the outer circumferential edge of the packing 119 is gripped between the lower surface of the cover flange 122 and the upper surface of the diaphragm cover 120. A depressed portion 122b that accommodates the head of a screw 132 is provided at the lower edge of the cover flange 122.

A cylindrical portion 173 protruding upward is provided on the upper surface of the cover flange 122 concentrically with the through-hole 122a, and a ring-shaped protrusion 174 protruding downward is provided on the lower surface.

The cylindrical portion 173 is inserted on the inner circumferential side of the protrusion 183 of the housing 181, and its outer circumferential surface comprises a cylindrical surface having a diameter substantially the same as the inner diameter of the protrusion 183 of the housing 181. This outer circumferential surface comprises a cylindrical second alignment surface 175 that receives the second alignment reference surface 187 of the housing 181 and aligns the housing 181 concentrically with the through-hole 122a.

The ring-shaped portion on the upper surface of the cover flange 122, located on the outer circumferential side of the cylindrical portion 173, is a flat surface that is substantially orthogonal to the through-hole 122a.

The inner circumferential surface of the protrusion 174 comprises a third alignment reference surface 176 that is shaped as a cylindrical inner surface that is concentric with the second alignment surface 175. The end surface (lower end surface) of the protrusion 174 is a flat surface that is substantially orthogonal to the through-hole 122a.

On the upper surface of the cover flange 122, a guide pin 184 is disposed substantially parallel to the axis of the rotary shaft 115a of the motor 115. The inner circumferential surface of a through-hole 117g of the slider 117 contacts the outer circumferential surface of the guide pin 184. In this way, the rotary shaft 115a and the slider 117 are prevented from rotating together.

A stopper 185 that extends out to the upper surface of the slider 117 to receive the upper surface of the slider 117 is provided at the upper edge of the guide pin 184.

The stopper 185 receives the slider 117 before the slider 117 contacts the base of the protruding portion 116b of the coupling 116 so as to prevent the slider 117 from ascending farther when the slider 117 ascends by rotating the rotary shaft 115a of the motor 115.

As shown in FIGS. 1 and 6, the cover 123 is disposed in contact with the upper area of the body 33 and accommodates the driving unit 111, described above. Cable packing (not shown) is provided between the cover 123 and the cable 129, and an O-ring 136 (see FIG. 6) is provided between the cover 123, and the body 33 and the diaphragm cover 120. The cable packing and the O-ring 136 are formed of, for example, fluororubber (FKM).

The body 33 is shaped as a substantially cubic block with the fluid channel 141 formed inside, and is formed of, for example, a fluorine resin material, such as PTFE (polytetrafluoroethylene), PCTFE (polychlorotrifluoroethylene), PFA (a copolymer of tetrafluoroethylene perfluoroalkoxy vinyl ether), or PEEK (trademark; polyetheretherketone).

On one side (right surface in FIG. 1) of the body 33, a joint structure 36 connecting the upstream side of the fluid channel 141 in the body 33 and the fluid transportation pipe is provided, and a joint structure 37 connecting the downstream side of the fluid channel 141 and the orifice unit 13 is provided on the side opposite to the joint structure 36.

As shown in FIG. 6, a port 143 that is connected to the second pressure sensor 31 via the fluid inlet 141 is provided in an area on the upper surface of the body 33, where the diaphragm cover 120 is disposed.

The port 143 includes a needle-storing portion 143a that receives a needle portion 114b of the diaphragm needle 114 when the diaphragm needle 114 is in a closed state (a state represented by the solid lines in FIG. 6) and a diaphragm storing portion 143b that contacts the lower surface of a diaphragm portion 114c of the diaphragm needle 114 when the diaphragm needle 114 is in the closed state.

The needle-storing portion 143a is formed of a depressed portion having a circular shape in plan view. The bottom surface of the needle-storing portion 143a is a horizontal surface, and a fluid inlet 141a that connects to the fluid inlet 141 is provided at the center portion of the bottom surface.

The diaphragm storing portion 143b is a cone-shaped space shaped like a donut in plan view, is formed outside of the needle-storing portion 143a in the radial direction, above the bottom surface of the needle-storing portion 143a. The diaphragm storing portion 143b is formed such that the depth gradually decreases from the inside to the outside in the radial direction. A fluid outlet 143c connected to the downstream side of the connecting channel 141 is provided in the diaphragm storing portion 143b.

The upper surface of the body 33 is provided with a depressed groove 112a for accommodating a ring-shaped protruding portion 114d protruding downward from the outer circumferential edge of the diaphragm needle 114.

On another side of the body 33 (the surface farthest from the plane of the drawing sheet of FIG. 7), a discharge outlet, not shown in the drawing, is provided, and a discharge channel (not shown) connecting to the communication channel 120c formed on the diaphragm cover 120 is provided on another side of the body 33. A duckbill valve is disposed inside the discharge channel. This duckbill valve is a so-called check valve formed of, for example, fluororubber (FKM).

The base 38 is a plate-like member disposed in contact with the lower surface of the body 33. A depressed portion for accommodating the head of the pan-head machine screw 133 for fixing the diaphragm cover 120, the cover flange 122, the base 38, and the body 33 is provided on the lower edge of the base 38.

The body 33 is disposed on an upper surface 113a of the base 38 in a fixed manner. The upper surface 113a of the base 38 is an inclined surface that is gradually inclined upward from one side of the body 33 to another side (in other words, from the inlet side of the fluid channel in the body 33 to the outlet side).

With the flow-rate control valve 32, when the control device 17 operates the motor 115 to rotate the rotary shaft 115a of the motor 115 in one direction (for example, clockwise when viewing FIG. 6 from above), the coupling 116 rotates in this direction together with the rotary shaft 115a. As the coupling 116 rotates, the slider 117 connected by the male threaded portion 116c of the coupling 116 and the female threaded portion 117a of the slider moves upward (ascends) along the housing 181. As the slider 117 ascends, the needle portion 114b and the diaphragm portion 114c of the diaphragm needle 114 connected to the slider 117 by the stopper 118 ascend together to enter a fully open state (a state represented by the double-dotted lines in FIG. 6). When the needle portion 114b ascends, a gap is formed between the fluid inlet 141a and the needle portion 114b, and the valve enters an open state (the valve opens) so that the fluid flows into the port 143, and the fluid that fills the port 143 continuously flows downstream of the fluid channel 141 through the fluid outlet 143c.

To decrease the flow rate of the fluid or to close the valve, the motor 115 is operated to rotate the rotary shaft 115a of the motor 115 in the other direction (for example, counterclockwise when viewing FIG. 6 from above).

With the flow-rate control valve 32, since the slider 117 is constantly urged upward by the spring 121, and backlash between the female threaded portion 117a of the slider 117 and the male threaded portion 116c of the coupling 116 is reduced (or eliminated). In this way, the generation of hysteresis in the flow rate can be prevented (or eliminated).

The direction of the force of the fluid passing through the port 143 acting upon the diaphragm needle 114 and the direction in which the spring 121 urges the slider 117 match in the flow-rate control valve 32. Therefore, the change in the amount of backlash of the female threaded portion 117a and the male threaded portion 116c caused by the pressure difference of the fluid can be substantially eliminated, and thus, the difference in flow rate due to opening and closing the valve, in other words, hysteresis in the flow rate, can be substantially eliminated.

The control device 17 carries out positional calibration of the diaphragm needle 114 at an appropriate timing, such as when power is turned on.

To calibrate the position of the diaphragm needle 114, the control device 17 inputs, to the motor 115, a pulsed signal having a number of pulses for rotating the rotary shaft 115a of the motor 115 by an angle required to move the diaphragm needle 114 from one end to the other end of the movable range of the diaphragm needle 114, determines that the diaphragm needle 114 is positioned at the other end of the movable range when the rotary shaft 115a stops, and subsequently controls the position of the diaphragm needle 114 within the movable range.

More specifically, to calibrate the position of the diaphragm needle 114, the control device 17 inputs a pulsed signal having a predetermined number of pulses to the motor 115 so as to rotate the rotary shaft 115a of the motor 115 by an angle required to move the diaphragm needle 114 from one end to the other end of its movable range (this angle is obtained from the design information of the flow-rate control valve 32).

Figure 8:
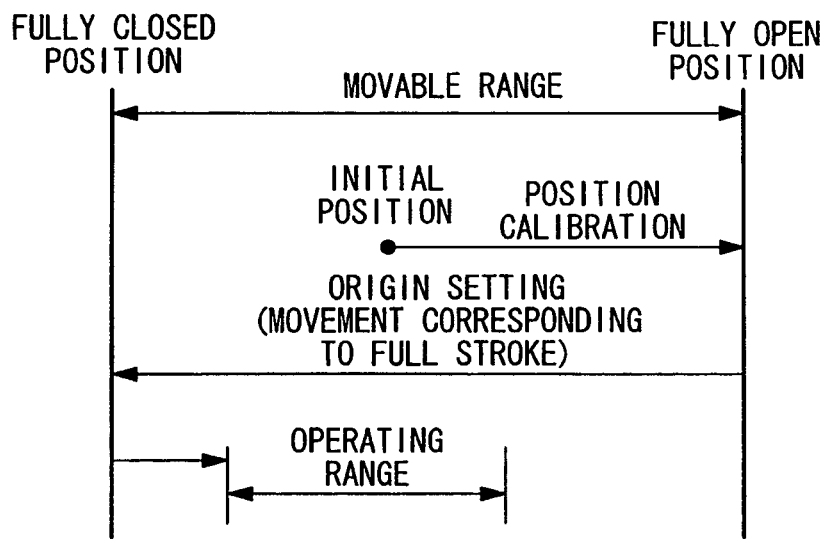
FIG. 8 illustrates the operation of the valve unit of the flow-rate controller according to the first embodiment of the present invention.

According to this embodiment, as shown in FIG. 8, to calibrate the position of the diaphragm needle 114, the control device 17 moves the diaphragm needle 114 to a fully open position by rotating the rotary shaft 115a in the direction in which the diaphragm needle 114 moves toward the open side (upward in FIG. 6) in the movable range.

In this way, when the rotation of the rotary shaft 115a is completed, the diaphragm needle 114 is positioned at the other end of the movable range, regardless of the position (initial position) at the beginning of the position calibration operation. When the diaphragm needle 114 is at a position other than an end of the movable range when the position calibration operation of the diaphragm needle 114 begins, the diaphragm needle 114 reaches the other end of the movable range and cannot move farther before the rotary shaft 115a is rotated by an angle corresponding to all of the pulses in the pulsed signal input to the motor 115. As a result, after that point, the rotary shaft 115a does not rotate any more, regardless of the number of remaining pulses.

In this way, after the diaphragm needle 114 is positioned at the other end of the movable range, the control device 17 determines that the diaphragm needle 114 is positioned at the other end of the movable range and carries out position control of the diaphragm needle 114 within the movable range.

According to this embodiment, the control device 17 carries out necessary control by inputting to the motor 115 a pulsed signal having a sufficient number of pulses for moving the diaphragm needle 114 to an end of the movable range (fully closed position) after the rotary shaft 115a is stopped, setting the position where the rotary shaft 115a stopped as the origin of the position control of the diaphragm needle 114, and then moving the diaphragm needle 114 within an operating range that is set in advance.

When the diaphragm needle 114 is within the movable range, since the rotary shaft rotates by an angle corresponding to all of the pulses in the pulsed signal input to the motor 115, a constant relationship is established between the number of pulses in the pulsed signal and the position of the diaphragm needle 114.

In this way, in the flow-rate controller 10 according to this embodiment, once the diaphragm needle 114 is positioned at the other end of the movable range, the position of the diaphragm needle 114 can be specified on the basis of the number of pulses in the pulsed signal subsequently input to the motor 115. Accordingly, the position of the diaphragm needle 114 can be accurately determined without using a rotary encoder.

According to this embodiment, to calibrate the position of the diaphragm needle 114, the diaphragm needle 114 is moved to the open side of the movable range or, in other words, in the direction that avoids interference with the needle-storing portion 143a of the flow-rate control valve 10. Therefore, even when position calibration of the diaphragm needle 114 is repeated, the diaphragm needle 114 and the body 33 are less likely to experience wear.

With the flow-rate control valve 32, by inserting the cylindrical portion 162 of the motor 115 into the inner flange 182 of the housing 181 when the motor 115 is attached to the body 33, the first alignment reference surface 163 of the motor 115 is received by the first alignment surface 186 of the housing 181 so that the rotary shaft 115a of the motor 115 is concentric with the axis of the inner flange 182 of the housing 181 and the protrusion 183.

In this state, by inserting the cylindrical portion 173 of the cover flange 122 on the inner circumferential side of the protrusion 183 of the housing 181, the second alignment reference surface 187 of the housing 181 is received by the second alignment surface 175 of the cover flange 122 so that the protrusion 183 of the housing 181 is concentric with the cylindrical portion 173, the protrusion 174, and the through-hole 122a of the cover flange 122. In other words, the rotary shaft 115a of the motor 115 is concentric with the cylindrical portion 173, the protrusion 174, and the through-hole 122a of the cover flange 122.

In this state, by inserting the cylindrical portion 177 of the diaphragm cover 120 on the inner circumferential side of the protrusion 174 of the cover flange 122, the third alignment reference surface 176 of the cover flange 122 is received by the third alignment surface 179 of the diaphragm cover 170, and the protrusion 174 of the cover flange 122 is positioned concentrically with the cylindrical portion 177 of the diaphragm cover 170 and the through-hole 120a. In other words, the rotary shaft 115a of the motor 115 is concentric with the cylindrical portion 177 of the diaphragm cover 120 and the through-hole 120a.

Since the diaphragm cover 120 is aligned with respect to the body 33 such that the through-hole 120a is concentric with the diaphragm needle 114, the rotary shaft 115a of the motor 115 is also concentric with the diaphragm needle 114.

In this way, with the flow-rate control valve 32 according to this embodiment, the motor 115, the housing 181, the cover flange 122, and the diaphragm cover 120 are each connected by a so-called spigot coupling. By merely connecting these members, the position and the orientation of the motor 115 with respect to the body 33 is set in a manner suitable for the driving of the diaphragm needle 114. Consequently, position and orientation adjustment operations of the motor 115 with respect to the body 33 are unnecessary.

Therefore, according to the flow-rate control valve 32, highly accurate assembly can be easily and quickly carried out during production and maintenance, regardless of the technical skills of the assembly worker. Accordingly, the flow-rate control valve 32 has excellent productivity and operability. Moreover, the flow-rate control valve has less variation in the assembly accuracy for each product or maintenance operation, and is capable of ensuring high performance as a flow-rate control valve.

Each of the above-described alignment reference surfaces is not limited to the above-described cylindrical surface or cylindrical inner surface and may be formed of one or more curved surfaces or a plurality of flat surfaces in which at least one surface is disposed in a direction different from the other surfaces. When the alignment reference surface is a curved surface, the corresponding alignment surface is formed of a curved surface having the same curvature in the opposite direction.

When the alignment reference surface is formed of a plurality of flat surfaces, the alignment surface connected thereto is formed of a plurality of flat surfaces corresponding to the alignment reference surface.

In this flow-rate control valve 32, the stopper 185 is provided on the guide pin 184 for preventing the slider 117 and the base of the protruding portion 116b of the coupling 116 from rotating together. In this way, when the slider 117 ascends, interference at the slider 117 and the base of the protruding portion 116b of the coupling 116 is prevented, the problem of these members over-screwing can be reliably prevented, and excellent operation can be always carried out.

In this embodiment, the rotary shaft 115a and the slider 117 are connected with the coupling 116. However, the present invention is not limited thereto, and the coupling 116 may be omitted by directly providing a male threaded portion on the outer surface of the rotary shaft 115a.

In this way, the distance between the motor 115 and the slider 117 can be decreased to shorten the longitudinal length (length in the vertical direction) of the flow-rate control valve, and the size of the valve can be reduced.

In this embodiment, the spring 121 is a compression coil spring interposed between the slider 117 and the cover flange 122. However, the spring 121 is not limited thereto, and may be a compression coil spring interposed between the motor 115 and the slider 117. In this case, also, backlash of the female threaded portion 117a of the slider 117 and the male threaded portion 116c of the coupling 116 is reduced (or eliminated).

Figure 9:
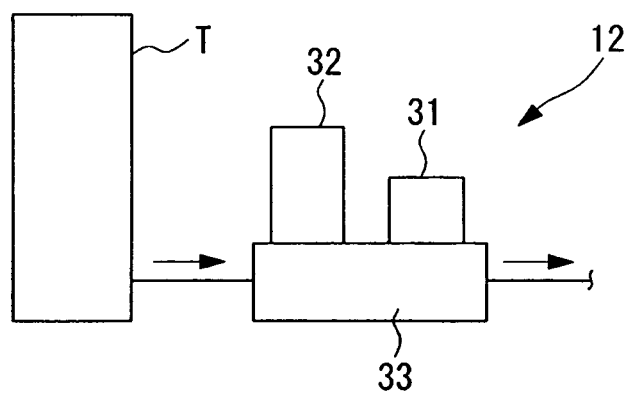
FIG. 9 illustrates another usage example of the valve unit of the flow-rate controller according to the first embodiment of the present invention.

As shown in FIG. 9, in the valve unit 12, the flow-rate control valve 32 is connected to the upstream side and the second pressure sensor 31 is connected to the downstream side, with respect to a fluid outlet of a sealed container T.

Accordingly, by allowing the passing of excess fluid when the inner pressure of the sealed container T exceeds a set pressure, the valve unit 12 functions as a pressure relief valve that maintains the inner pressure in the sealed container T at a set pressure or lower.

As shown in FIGS. 1 and 2, the orifice unit 13 constitutes a fluid channel and an orifice that connect the regulator unit 11 and the valve unit 12 by being connected to the regulator unit 11 and the valve unit 12 in a detachable manner.

More specifically, the orifice unit 13 includes a tube portion constituting a fluid channel, an orifice provided inside the tube, and a joint structure provided at each end of the tube portion.

As shown in FIG. 1, the orifice unit 13, together with the first pressure sensor 22 of the regulator unit 11, the second pressure sensor 31 of the valve unit 12, and the control device 17, constitutes a differential-pressure flow meter that measures the flow rate of a fluid passing through the flow-rate controller 10.

Here, for the differential-pressure flow meter, if P1 represents the fluid pressure upstream of the orifice unit 13, P2 represents the fluid pressure downstream of the orifice unit 13, and Q represents the flow rate of the fluid supplied to the orifice unit 13, the following Equation (1) holds:

i. $Q=k\sqrt{(P1-P2)}$  (1)

The proportionality constant k in Equation (1) is a constant depending on the shape of the orifice unit 13 or the hole-diameter of the orifice and is determined by actual measurements.

According to this embodiment, the flow-regulating valve 32 is connected to the downstream side of the second pressure sensor 31. In this way, sufficiently great back-pressure can be applied to the first and second pressure sensors 22 and 31 to stabilize the properties of the first and second pressure sensors 22 and 31, and the measurement accuracy of the first and second pressure sensors 22 and 31 is less likely to be affected even when there is a pressure change in the fluid supplied to the flow-rate controller 10.

Moreover, according to this embodiment, the regulator 21 for suppressing pressure change of the fluid supplied to the first pressure sensor 22 so as to maintain a predetermined pressure is provided on the upstream side of the first pressure sensor 22.

In this way, the measurement accuracy of the first and second pressure sensors 22 and 31 is less likely to be affected even when there is a pressure change in the fluid supplied to the flow-rate controller 10 due to disturbance caused by, for example, other pipe systems connected in parallel with the fluid transportation pipe whose flow rate is to be regulated.

The control device 17 controls the degree of opening of the flow-rate control valve 32 such that the difference between the measurement values or output voltages of the first pressure sensor 22 and the second pressure sensor 31 becomes a predetermined value set in advance. More specifically, when the difference of the output values or the difference of the output voltages of the pressure-measuring devices is lower than a target value set in advance, the degree of opening of the flow-rate control valve 32 is increased to increase the flow rate, whereas, when the difference of the output values or the difference of the output voltages of the pressure sensors is higher than the target value, the degree of opening of the flow-rate control valve 32 is decreased to decrease the flow rate.

According to this embodiment, the control device 17 controls the flow-rate control valve 32 by using a PID control method, which has excellent control accuracy and response.

Here, the control device 17 may determine the flow rate of the fluid passing through the flow-rate controller 10 on the basis of the difference of the measurement values or output voltages of the first pressure sensor 22 and the second pressure sensor 31 and may control the degree of opening of the flow-rate control valve 32 such that the difference is eliminated.

The details of the structure of the orifice unit 13 will be described below.

Figure 10:
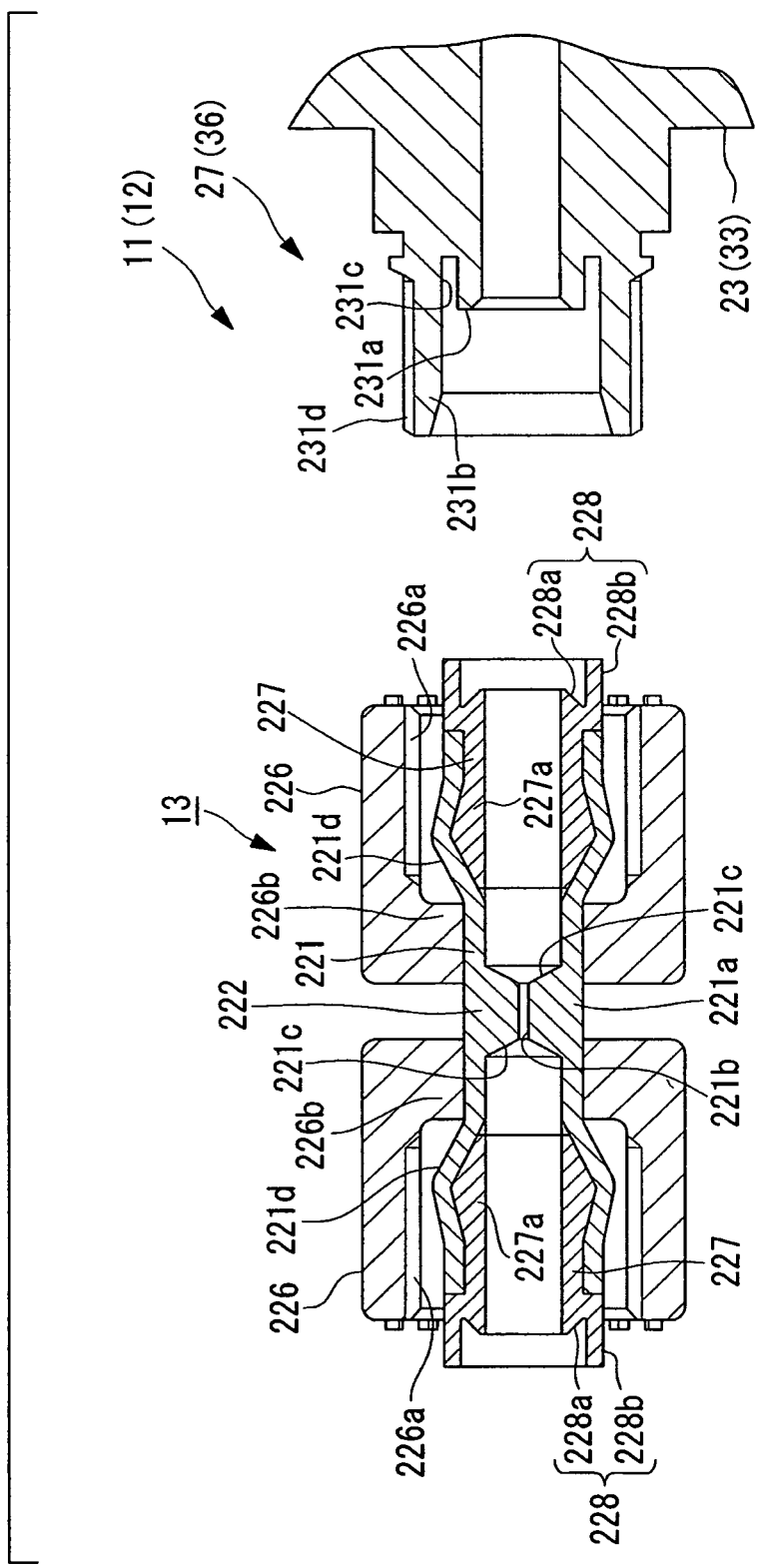
FIG. 10 is a longitudinal cross-sectional view illustrating an orifice unit of the flow-rate controller according to the first embodiment of the present invention.

As shown in FIG. 10, in the orifice unit 13, a tube portion 221, one end of which is connected to the regulator unit 11 and other end of which is connected to the valve unit 12 and whose internal part forms a channel connecting the regulator unit 11 and the valve unit 12, and an orifice 222 provided inside the tube portion 221 are integrated.

The orifice unit 13 is formed of a material that is less likely to cause contamination of the fluid circulated through the inner channel and less likely to be affected by the fluid, for example, PFA (a copolymer of tetrafluoroethylene and perfluoroalkoxy vinyl ether).

In this embodiment, the orifice unit 13 has a substantially cylindrical shape in which only a center portion 221a along the longitudinal direction of the tube portion 221 is solid. A center portion 221a in the longitudinal direction has a narrow hole 221b that connects one end to another end in the longitudinal direction and that is formed concentrically with the axis of the tube portion 221. This center portion 221a in the longitudinal direction forms the orifice 222.

In other words, in the orifice unit 13, the tube portion 221 and the orifice 222 are integrated, and there is no joint between the tube portion 221 and orifice 222, which may cause accumulation of fluid.

Therefore, in the orifice unit 13, when the fluid circulated through the channel is changed, the remaining fluid in the channel is reliably pushed out by the fluid newly supplied to the channel, and the fluid in the channel can be quickly changed.

Furthermore, in the orifice unit 13, since the tube portion 221 and the orifice 222 are integrated, only a small number of components are required, production is easy, and a member, such as an O-ring, that may cause contamination of the channel does not have to be provided.

Such an orifice unit 13 can be manufactured by injection molding using a mold or by machining (cutting etc.).

The inner surface of the tube portion 221 and the inner surface of the narrow hole 221b are connected by a tapered surface 221c whose diameter decreases from an edge, in the longitudinal direction, of the tube portion 221 toward the center in the longitudinal direction. In other words, an inclined surface following the flow of the fluid in the tube portion 221 is provided between the inner surface of the tube portion 221 and the inner surface of the narrow hole 221b. In this way, the fluid that reaches the center portion 221a in the longitudinal direction in the tube portion 221 is smoothly guided to the narrow hole 221b, and the fluid that passes through the narrow hole 221b is smoothly pushed downstream. Consequently, fluid is less likely to accumulate at the boundary of the orifice 222 and the tube portion 221.

At each end of the tube portion 221, a nut 226 for inserting the end of the tube portion 221 and a sleeve 227 that is inserted into the end of the tube portion 221 and that forms a large-diameter portion 221d at the end of the tube portion 221 by widening the section near the end of the tube portion 221 outwards in the radial direction are provided.

On the nut 226, a female threaded portion 226a is provided on the inner circumferential surface, and an engagement protrusion 226b that protrudes inward in the radial direction of the nut 226 and engages with the large-diameter portion 221*d* is provided closer to the center portion 221*a* in the longitudinal direction of the tube portion 221 than the female threaded portion 226*a*. According to this embodiment, the engagement protrusion 226*b* is an internal flange that is formed around the entire circumference of the nut 226.

The sleeve 227 is a substantially cylindrical member whose internal section forms the channel and is inserted into the tube portion 221 with one end thereof protruding from the end of the tube portion 221.

In the sleeve 227, the end protruding from the end of the tube portion 221 (hereinafter this end is referred to as the "protruding end") is an engagement portion 228 that is shaped to engage with the joint structure 27 of the regulator unit 11 or the joint structure 36 of the valve unit 12.

According to this embodiment, the engagement portion 228 includes a substantially ring-shaped contact surface 228*a* that surrounds the open end of the channel of the sleeve 227 and that is in surface contact with an end surface of the joint structure 27 of the regulator unit 11 or the end surface of the joint structure 36 of the valve unit 12 and a cylindrical portion 228*b* that protrudes farther than the contact surface 228*a* and surrounds the contact surface 228*a*.

At the end of the sleeve 227 inserted in the tube portion 221, a large-diameter portion 227*a* that widens the tube portion 221 outwards in the radial direction is provided.

The joint structure 27 of the regulator unit 11 and the joint structure 36 of the valve unit 12 are described below.

Since the structure of the joint structure 36 of the valve unit 12 is substantially the same as the structure of the joint structure 27 of the regulator unit 11, only the structure of the joint structure 27 of the regulator unit 11 will be described below, and a detailed description of the joint structure 36 of the valve unit 12 will be omitted.

The joint structure 27 of the regulator unit 11 is provided at the end portion of the body 23 on the downstream side. The joint structure 27 includes a substantially ring-shaped contact surface 231*a* that surrounds the open end of the fluid channel of the body 23 on the downstream side and that is in surface contact with the contact surface 228*a* of the sleeve 227 of the orifice unit 13; a cylindrical portion 231*b* that protrudes farther than the contact surface 231*a* and surrounds the contact surface 231*a*; and a ring-shaped depressed portion 231*c* that is interposed between the contact surface 231*a* and the cylindrical portion 231*b* and into which the cylindrical portion 228*b* of the orifice unit 13 is inserted.

On the outer circumferential surface of the cylindrical portion 231*b*, a male threaded portion 231*d* that is screwed into the female threaded portion 226*a* of the nut 226 of the orifice unit 13 is formed.

Here, a standard connection structure can be used as the connection structure for the regulator unit 11 and the fluid transportation pipe of the valve unit 12.

Figure 11:
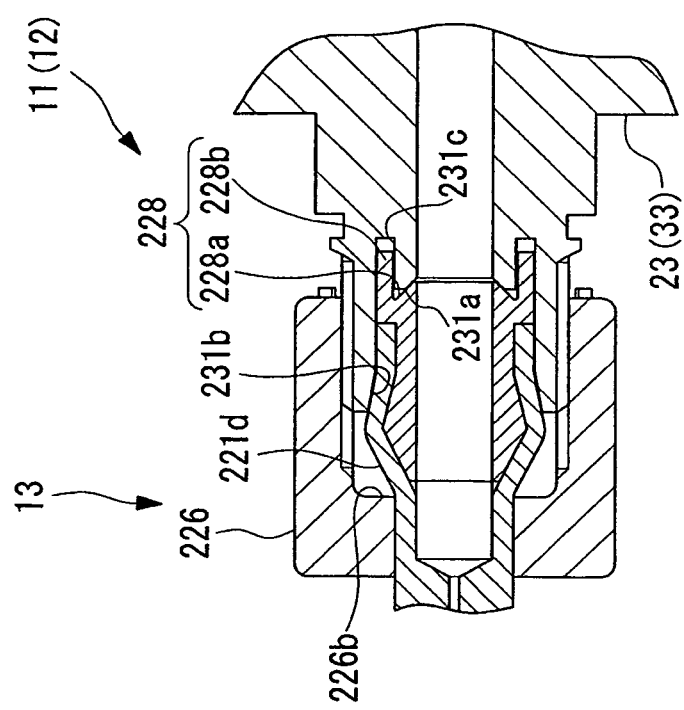
FIG. 11 is a longitudinal cross-sectional view illustrating the connection structure of the orifice unit and the regulator unit with the valve unit of the flow-rate controller according to the first embodiment of the present invention.

To connect the orifice unit 13 and the regulator unit 11 on the flow-rate controller 10 having such a structure, to connect the orifice unit 13 and the regulator unit 11, while one end of the tube portion 221 in the longitudinal direction is facing the joint structure 27 of the regulator unit 11, the nut 226 through which this end is passed is engaged with the male threaded portion 231*d* provided on the cylindrical portion 231*b* of the joint structure 27, and the nut 226 is tightened. In this way, the engagement portion 228 of the sleeve 227 protruding from this end moves relatively close to the joint structure 27, together with the nut 226. When the nut 226 is sufficiently tightened, as shown in FIG. 11, the contact surface 228*a* forming the engagement portion 228 of the sleeve 227 and the contact surface 231*a* of the joint structure 27 are pushed towards each other while being in surface contact, and the cylindrical portion 228*b* forming the engagement portion 228 of the sleeve 227 is inserted into the depressed portion 231*c* of the joint structure 27. In this way, the engagement portion 228 and the joint structure 27 are fixed in an airtight, liquid-tight manner.

By loosening the nut 226, the fixed engagement portion 228 and the joint structure 27 are freed.

The connection and disconnection operations of the orifice unit 13 and the valve unit 12 are the same as the connection and disconnection operations of the orifice unit 13 and the regulator unit 11.

In other words, in the orifice unit 13 of the flow-rate controller 10, connection to and disconnection from the pressure-measuring devices can be easily carried out by moving the nut 226.

With the above-described flow-rate controller 10, since the components are included in three independent units, and thus, the number of components is small compared to when each of the components are provided as an independent component, the ease of handling is improved. In the flow-rate controller 10, compared to when each of the components are provided as an independent component, the number of joints for connecting the components is small. Consequently, the size of the entire apparatus is reduced, and the ease of handling is improved.

Since the entire flow-rate controller 10 can be separated into three independent units that can be handled independently, the ease of handling is improved compared to when the all of the components are integrated.

In the flow-rate controller 10, since the orifice that requires frequent maintenance is constituted of the orifice unit 13 that is independent from the other units, only the orifice unit 13 can be removed for maintenance, and thus the flow-rate controller 10 is capable of maintaining excellent performance.

In the flow-rate controller 10, each unit can be changed to a unit having the best specification depending on the intended use. For example, by changing the orifice unit 13 to another orifice unit 13 whose orifice diameter differs, the flow-rate measurement range of the differential-pressure flow meter including the first pressure sensor 22, the orifice unit 13, and the second pressure sensor 31 can be changed.

Since the flow-rate controller 10 includes the regulator 21, the pressure of the fluid supplied to the first and second pressure sensors 22 and 31 via the regulator unit 11 is stabilized.

In other words, in the flow-rate controller 10, the pressure of the fluid supplied to the differential-pressure flow meter including the first and second pressure sensors 22 and 31 and the orifice unit 13 is stabilized. In this way, even when the pressure of the fluid supplied to the flow-rate controller 10 fluctuates due to a turbulent flow or the like, superior feedback control based on the measurement value of the differential-pressure flow meter can be carried out.

The flow-rate controller 10 includes fixing portions 29 and 39 that fix the regulator unit 11 and the valve unit 12 in a mutually detachable manner. In this way, by fixing the regulator unit 11 and the valve unit 12 using the fixing portions 29 and 39, the regulator unit 11 and the valve unit 12 can be handled as a single unit, and the ease of handling is improved.

Figure 12:
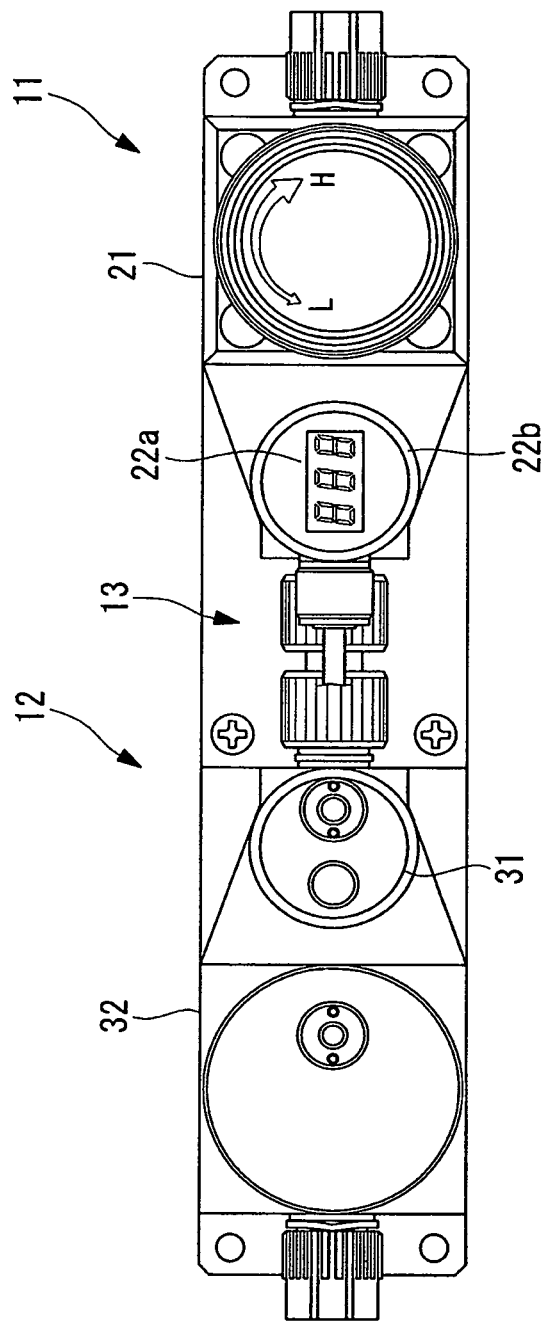
FIG. 12 is a plan view of another configuration example of a regulator unit of the flow-rate controller according to the first embodiment of the present invention.

As shown in FIG. 12, with the above-described regulator unit 11, instead of the first pressure sensor 22, a first pressure sensor 22*b* having a display device 22*a* that allows visual confirmation of a measurement value (i.e., pressure of the fluid sent out from the regulator 21) may be provided. In such a case, the operator can easily confirm the operation result of the regulator 21, making it easy for the operator to carry out adjustment of the regulator 21.

As the display device 22a, an analog meter that displays a measurement value by the position of a needle or a digital meter that displays the measurement value as a numeric value may be used.

Figure 13:
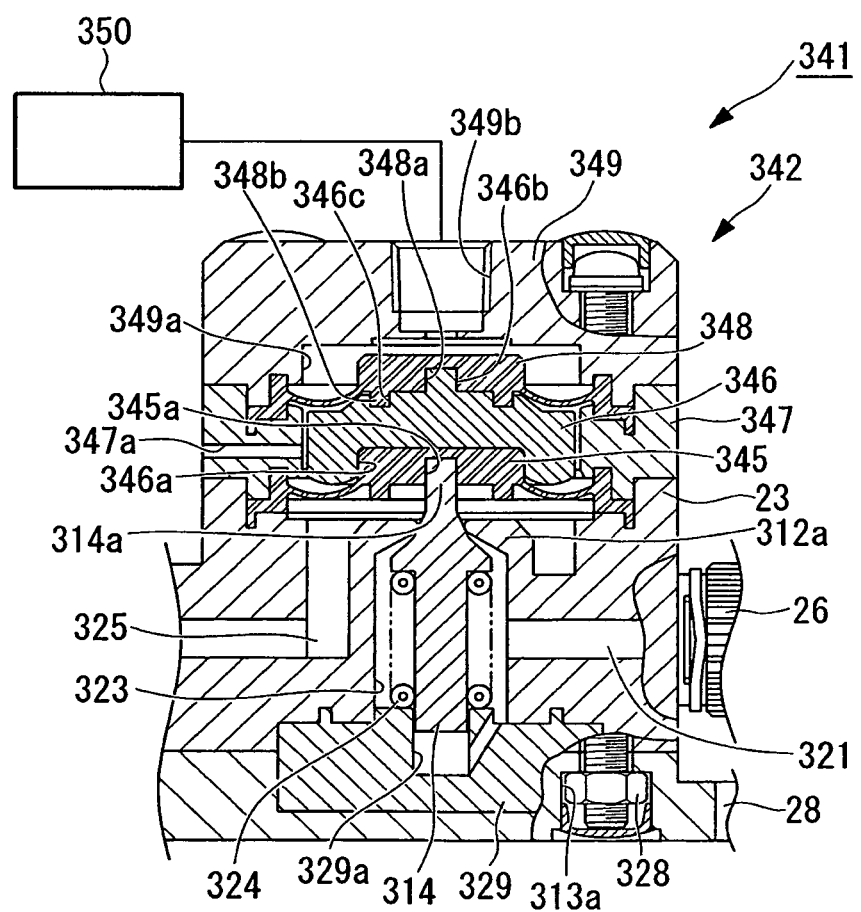
FIG. 13 is a longitudinal cross-sectional view of another configuration example of the regulator unit of the flow-rate controller according to the first embodiment of the present invention.

As shown in FIG. 13, with the above-described regulator unit 11, instead of the regulator 21, an air-operated regulator 341 using pneumatic pressure may be provided.

As shown in FIG. 13, the regulator 341 is configured such that, instead of the operating unit 311, a driving unit 342 is provided in the regulator 21.

The driving unit 342 includes a first diaphragm 345, a diaphragm bed 346, a center housing 347, a second diaphragm 348, a housing 349, and an air supply device 350.

One side (lower surface in FIG. 13) of the first diaphragm 345 is provided with a depression 345a for receiving (for engaging with) a protruding portion 314a formed on the end surface (upper end in FIG. 13) of the needle 314. The center portion of the depression 345a is capable of receiving (engaging with) a first depressed portion 346a formed on one end (lower end in FIG. 13) of the diaphragm bed 346.

The diaphragm bed 346 is a member substantially shaped as a sideways letter U in a longitudinal cross-sectional view. One side of the diaphragm bed 346 has the first depressed portion 346a that engages with the center portion of the first diaphragm 345. On another side (upper side in FIG. 13) of the diaphragm bed 346, a cylindrical protruding portion 346b that is received by (engages with) a depressed portion 348a shaped as a round hole formed in the lower end surface of the second diaphragm 348 and an annular second depression 346b that receives (accommodates) an annular protrusion 348c provided at the lower end surface of the second diaphragm 348 are provided in a concentric manner.

The center housing 347 is a substantially cylindrical member fixed on the upper surface of the body 23. By being fixed on the body 23, the lower edge of the center housing 347 and the upper surface of the body 23 grip and fix the outer circumferential edge of the first diaphragm 345. On the inner side of the center housing 347 in the radial direction, the diaphragm bed 346 is stored in a manner such that it is displaceable in the vertical direction. At the center portion in the height direction of the center housing 347, a vent hole 347a connecting the inner circumferential surface and the outer circumferential surface is provided. In this way, the inside of the center housing 347 is kept at atmospheric pressure.

The center of the lower end surface of the second diaphragm 348 has the depressed portion 348a shaped as a round hole that receives the protrusion 346b of the diaphragm bed 346 and the annular protrusion 348b that receives the protrusion 346b of the diaphragm bed 346 and that is provided concentrically with the depressed portion 348a.

The housing 349 is a disk-like member for fixing the second diaphragm 348 between the center housing 347 and the housing 349. A depression 349a that allows vertical displacement of the second diaphragm 348 is provided at the center of the lower surface of the housing 349.

A port 349b that is connected to the depression 349a is provided on the upper surface of the housing 349. The port 349b is connected to the air supply device 350 via a pipe.

In the regulator 341, the inner pressure of the space formed between the housing 349 and the second diaphragm 348 acts as a pressure pushing down the diaphragm bed 346 supported by the first diaphragm 345 and the second diaphragm 348. In other words, the regulator 341 is capable of adjusting the force that pushes the diaphragm bed 346 downward by adjusting the inner pressure of the space between the housing 349 and the second diaphragm 348 by adjusting the pressure of the air supplied by the air supply device 350.

When the diaphragm bed 346 is pushed downward by increasing the inner pressure of the space between the housing 349 and the second diaphragm 348, the first diaphragm 345 is depressed downward and the needle 314 is pushed downward against the urging force of the second spring 324. When the needle 314 is pushed downward, a gap is formed between the tapered portion (end portion) of the needle 314 and the first sheet portion 312a, causing the regulator 341 to enter an open state (open) so that the fluid flows out from the inlet side (primary side) to the outlet side (secondary side).

The control of the outlet-side pressure (secondary pressure) is carried out by balancing the inner pressure of the space between the housing 349 and the second diaphragm 348 and the outlet-side pressure (secondary pressure) through the first diaphragm 345 and the second diaphragm 348.

Accordingly, when the outlet-side pressure (secondary pressure) becomes greater than the inner pressure of the space between the housing 349 and the second diaphragm 348 due to an increase in the inlet-side pressure (primary pressure), the needle 314 moves upward as the first diaphragm 345 moves upward together with the diaphragm bed 346. In this way, the gap between the tapered portion of the needle 314 and the first sheet portion 312a decreases (the channel is throttled), causing the outlet-side pressure (secondary pressure) to decrease.

In contrast, when the outlet-side pressure (secondary pressure) becomes smaller than the inner pressure of the space between the housing 349 and the second diaphragm 348 due to a decrease in the inlet-side pressure (primary pressure), the needle 314 moves downward as the first diaphragm 345 moves downward. In this way, the gap between the tapered portion of the needle 314 and the first sheet portion 312a increases (the channel is widened), causing the outlet-side pressure (secondary pressure) to increase.

In this way, the needle 314 moves upward and downward following the change in the inlet-side pressure (primary pressure) to automatically adjust the degree of opening of the regulator 341. In this way, the outlet-side pressure (secondary pressure) is maintained at a constant value.

When the inner pressure of the space between the housing 349 and the second diaphragm 348 decreases, the diaphragm bed 346 moves upward and the needle 314 and the first diaphragm 345 is pushed upward by the urging force of the second spring 324. When the needle 314 is pushed upward, the gap between the tapered portion of the needle 314 and the first sheet portion 312a decreases, and finally, the regulator 341 enters a closed state (closed), and the flow of the fluid from the inlet side (primary side) to the outlet side (secondary side) stops.

Figure 14:
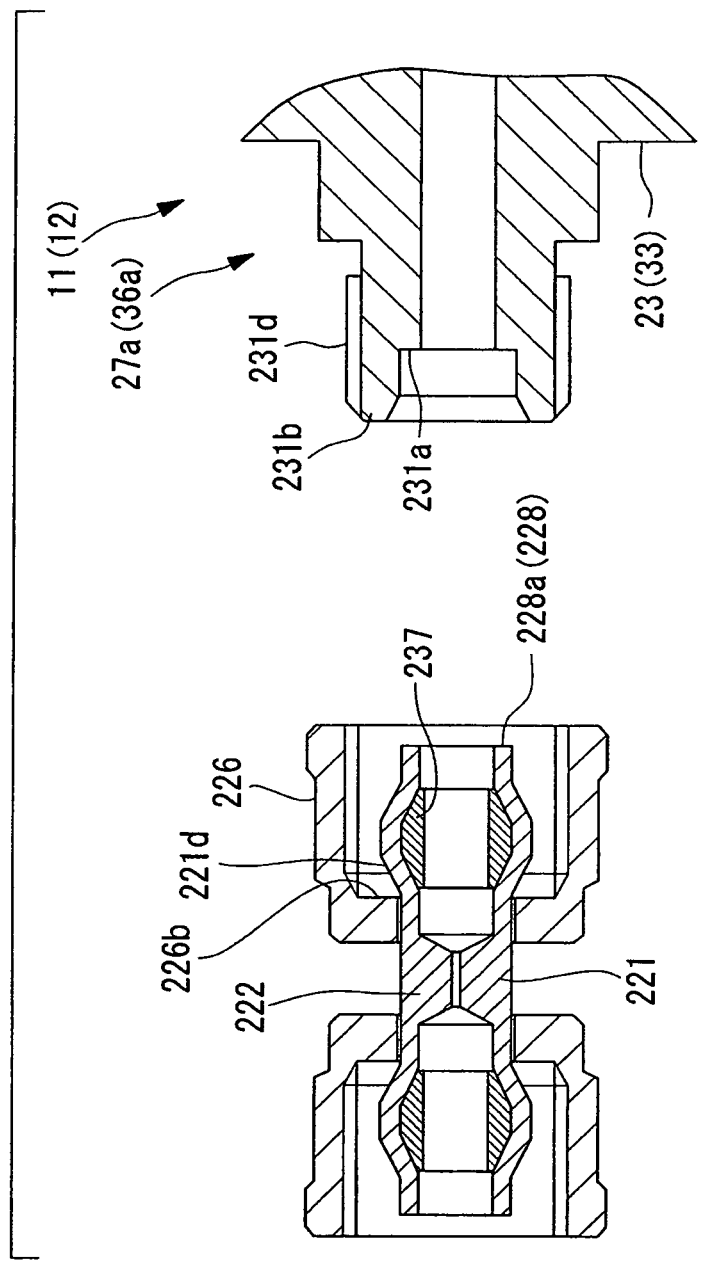
FIG. 14 is a longitudinal cross-sectional view of another configuration example of an orifice unit of the flow-rate controller according to the first embodiment of the present invention.
Figure 15:
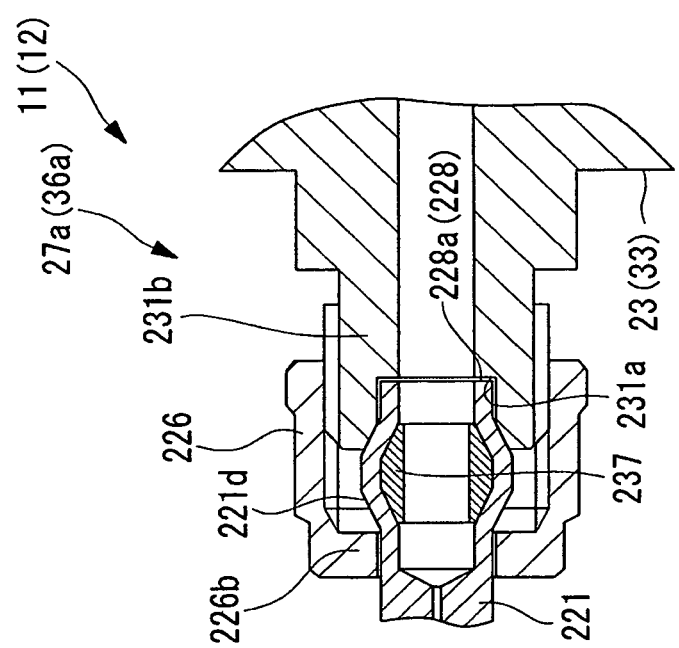
FIG. 15 is a longitudinal cross-sectional view of the connection structure of the orifice unit and the regulator unit with the valve unit illustrated in FIG. 14.

In this embodiment, the sleeve 227 is configured with the engagement portion 228. However, as shown in FIGS. 14 and 15, the configuration is not limited thereto, and, instead of the sleeve 227, a wide-diameter portion 221d may be formed on the tube portion 221 by inserting a ring-shaped sleeve 237, not having the engagement portion 228, beyond the end portion of the tube portion 221.

In this case, the end portion of the tube portion 221 constitutes the engagement portion 228 (however, the cylindrical portion 228b is not provided, and the end portion of the tube portion 221 functions as the contact surface 228a). Moreover, the regulator unit 11 and the valve unit 12 are configured with joint structures 27a and 36a with a depressed portion 231c removed, instead of the joint structures 27 and 36.

Figure 16:
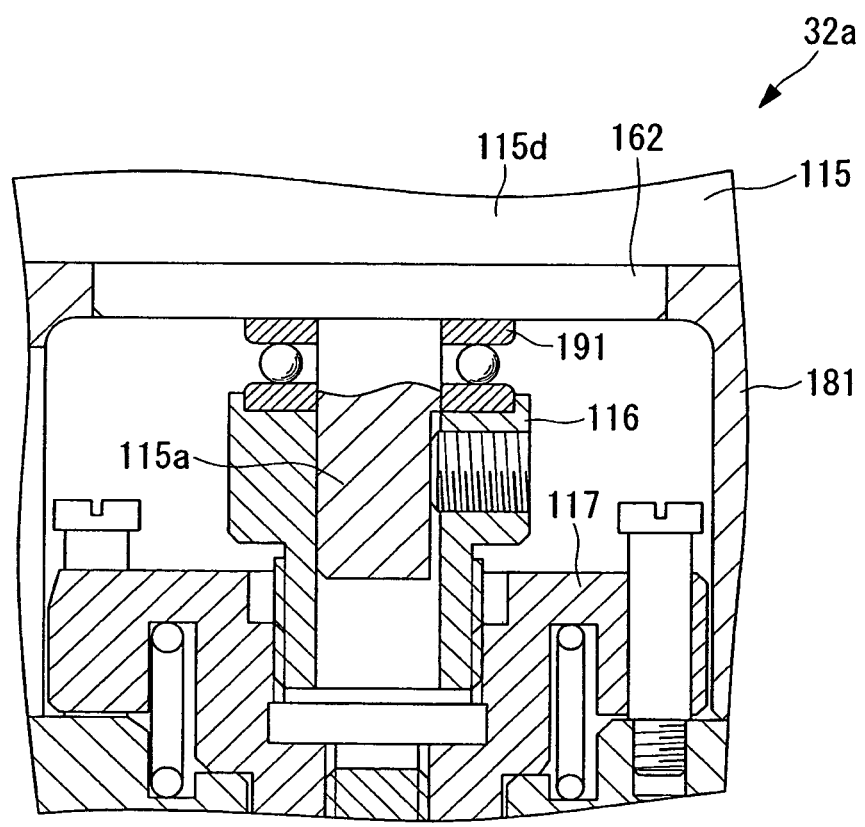
FIG. 16 illustrates another configuration example of a valve unit of the flow-rate controller according to the first embodiment of the present invention.

In the valve unit 12 according to this embodiment, instead of the flow-rate control valve 32, a flow-rate control valve 32a, shown in FIG. 16, may be used.

The flow-rate control valve 32a may be structured such that, in the flow-rate control valve 32, a thrust bearing 191 for receiving the thrust load applied to the rotary shaft 115a is provided on the outside of a motor main body 115d of the motor 115. FIG. 16 illustrates an example in which the thrust bearing 191 is interposed between the lower surface of the cylindrical portion 162 of the motor 115 and the upper surface of the coupling 116.

In this case, when the diaphragm needle 114 receives pressure from a fluid, the thrust load that is to be transmitted to the rotary shaft 115a via the diaphragm needle 114, the slider 117, and the coupling 116 is received by the thrust bearing 191 provided on the outside of the motor main body 115d and is released to the motor main body 115d. Therefore, the load applied to the support structure of the rotary shaft 115a in the motor 115 is reduced, and thus the performance of the motor 115 can be maintained for a long period of time.

In the flow-rate controller 10 according to this embodiment, the control device 17 may be configured such that, when the diaphragm needle 114, near the end of its movable range, moves toward the end of the movable range, the rotary shaft 115a of the motor 115 is rotated by a first driving torque and, when the diaphragm needle 114 moves away from the end of the movable range, the rotary shaft 115a of the motor 115 is rotated by a second driving torque that is greater than the first driving torque.

More specifically, to move the diaphragm needle 114 away from the end of the movable range, the control device 17 controlling the operation of the motor 115 operates the motor 115 by a second driving torque greater than the driving torque (first driving torque) for moving the diaphragm needle 114 to the end of its movable range.

In this way, in the flow-rate control valve 10, over-screwing can be easily eliminated even when over-screwing of the threaded portion occurs when the diaphragm needle 114 is moved to the end of the movable range.

The driving force of the motor 115 is proportional to the driving current supplied to the motor 115.

Accordingly, to achieve the above-described control, the control device 17 may be configured such that, when the diaphragm needle 114 is moved to an end of the movable range, the output limit value of the driving current for the motor 115 is set to a first limit value V1 and, when the diaphragm needle 114 is moved away from the end of the movable range, the output limit value is set to a second limit value V2 that is greater than the first limit value V1.

In the motor 115, the slower the rotation of the rotary shaft 115a is, the greater the torque is for driving the rotary shaft 115a.

Accordingly, to achieve the above-described control, the control device 17 may be configured such that, when the diaphragm needle 114 is moved to an end of the movable range, the rotary shaft 115a of the motor 115 is rotated at a first rotational speed R1 and, when the diaphragm needle 114 is moved away from the end of the movable range, the rotary shaft 115a of the motor 115 is rotated at a second rotation speed R2 that is lower than the first rotational speed R1.

Second Embodiment

A second embodiment of a flow-rate controller according to the present invention will be described with reference to FIGS. 17 and 18.

Figure 17:
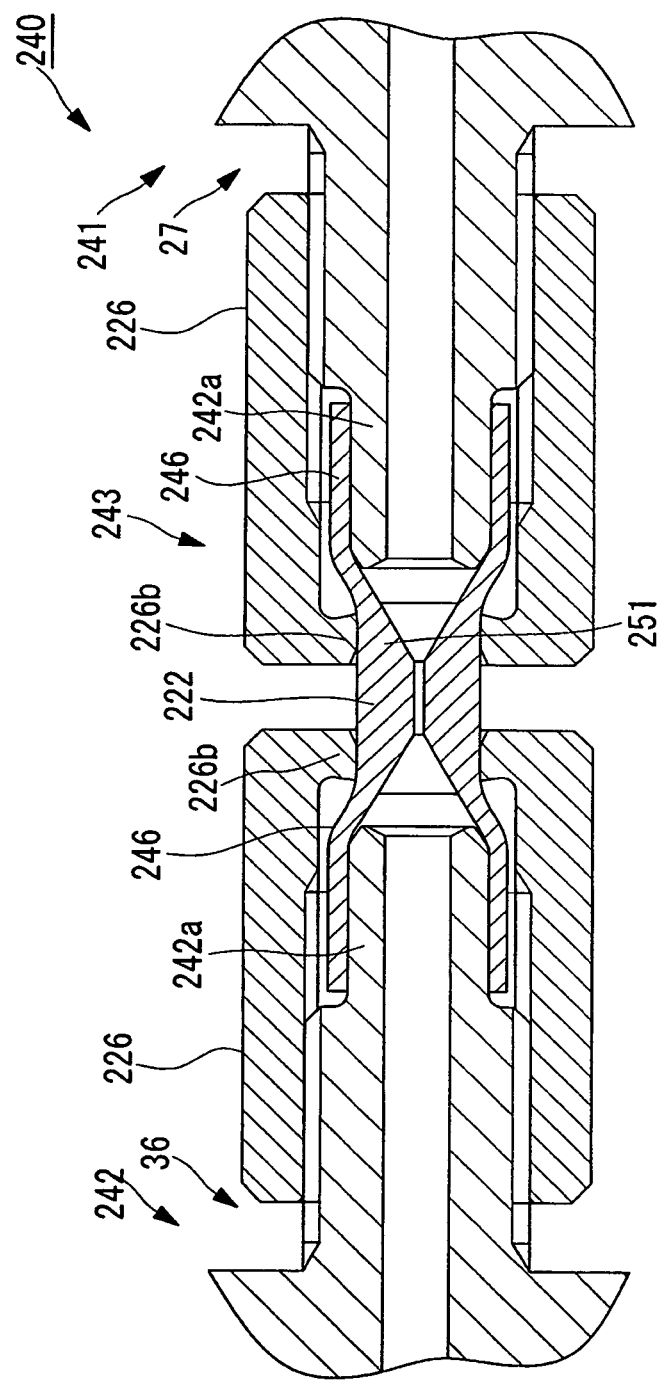
FIG. 17 is a longitudinal cross-sectional view illustrating the connection structure of an orifice unit and a regulator unit with a valve unit of a flow-rate controller according to a second embodiment of the present invention.

As shown in FIG. 17, a flow-rate controller 240 according to this embodiment is structured such that instead of the regulator unit 11, the valve unit 12, and the orifice unit 13 in the flow-rate controller 10 according to the first embodiment, a regulator unit 241, a valve unit 242, and an orifice unit 243, that have different connection structures for connecting the units, are used.

The members that are similar to or the same as those according to the above-described first embodiment are represented by the same reference numerals, and descriptions thereof are omitted.

Figure 18:
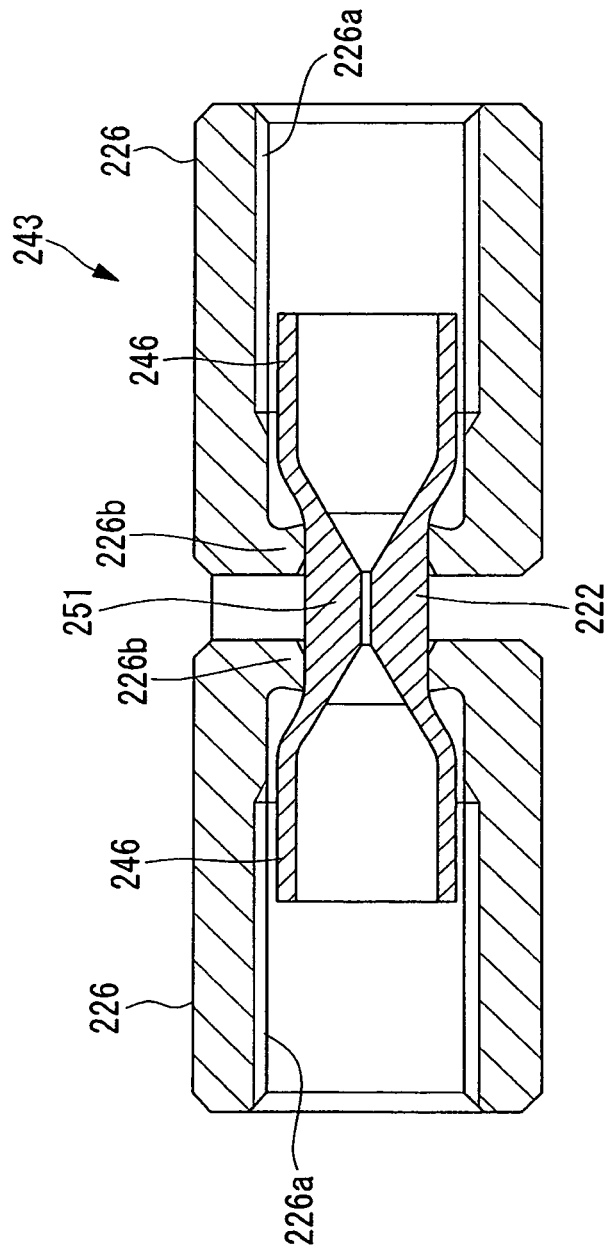
FIG. 18 is a longitudinal cross-sectional view illustrating the orifice unit of the flow-rate controller according to the second embodiment of the present invention.

As shown in FIG. 18, the orifice unit 243 is structured such that instead of the tube portion 221 and the sleeve 227 in the orifice unit 13 according to the first embodiment, a tube portion 251 is used, the tube portion 251 being configured such that the end passed through nut 226 comprises a large-diameter portion 246 having flexibility, having a diameter larger than other sections, and internally receiving the joint structure of the regulator unit 241 or the valve unit 242 and an engagement protrusion 226b of the nut 226 engages with the large-diameter portion 246.

Since the end of the tube portion 251 is flexible and deformable, it can be easily passed through the nut 226.

The regulator unit 241 is structured such that the contact surface 231a and the depressed portion 231c of the joint structure 27 in the regulator unit 11 according to the first embodiment are not provided, and an insertion portion 242a that is inserted into the large-diameter portion 246 of the tube portion 251 is provided at the edge of the cylindrical portion 231b.

The valve unit 242 is structured such that the joint structure 36 of the valve unit 12 according to the first embodiment has the same structure as the joint structure 27 of the regulator unit 241.

With the flow-rate controller 240 having such a structure, to connect the orifice unit 243 with the regulator unit 241 or the valve unit 242, the end of the tube portion 251 of the orifice unit 243 faces the insertion portion 242a of the regulator unit 241 or the valve unit 242, and the insertion portion 242a is inserted into the large-diameter portion 246 of the tube portion 251. By internally receiving the insertion portion 242a in this way, deformation of the large-diameter portion 246 is restricted, and the large-diameter portion 246 engages with engagement protrusion 226b provided on the inner circumferential surfaces of the nut 226.

With the insertion portion 242a inserted into the large-diameter portion 246, the nut 226 through which the tube portion 251 is passed engages with a male threaded portion 231d formed on the cylindrical portion 231b of the regulator unit 241 or the valve unit 242, and then the nut 226 is tightened. In this way, the large-diameter portion 246 of the tube portion 251, together with the nut 226, is moved relatively close to the cylindrical portion 231b. With the nut 226 sufficiently tightened, the large-diameter portion 246 of the tube portion 251 and the insertion portion 242a are engaged and fixed in an airtight, liquid-tight manner.

By loosening the nut, the end portion of the tube portion and the connection end of each pressure detection device are freed.

In other words, also in the flow-rate controller 240, connection and disconnection with the pressure-measuring devices can be easily carried out by moving the nut 226 of the flow-rate controller 240.

Third Embodiment

Figure 19:
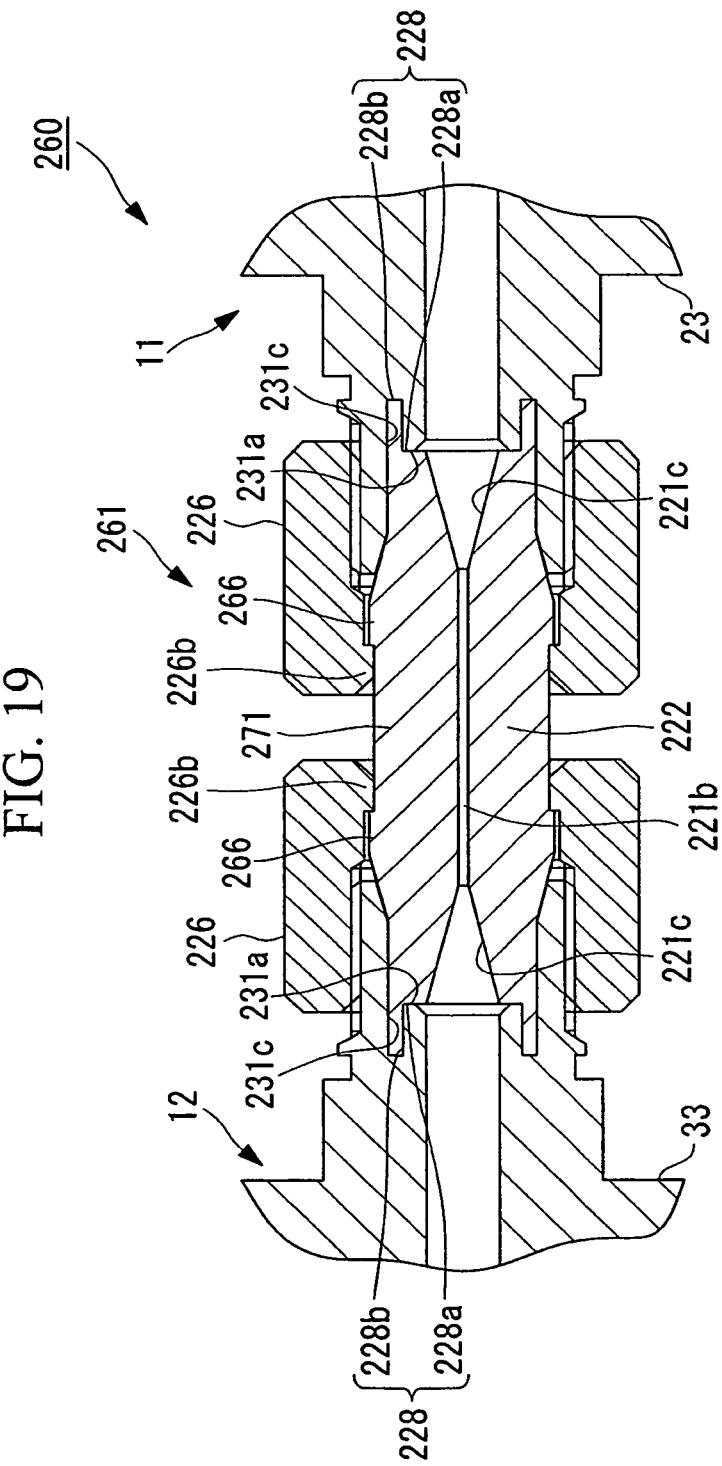
FIG. 19 is a longitudinal cross-sectional view illustrating the connection structure of an orifice unit and a regulator unit with a valve unit of a flow-rate controller according to a third embodiment of the present invention.
Figure 20:
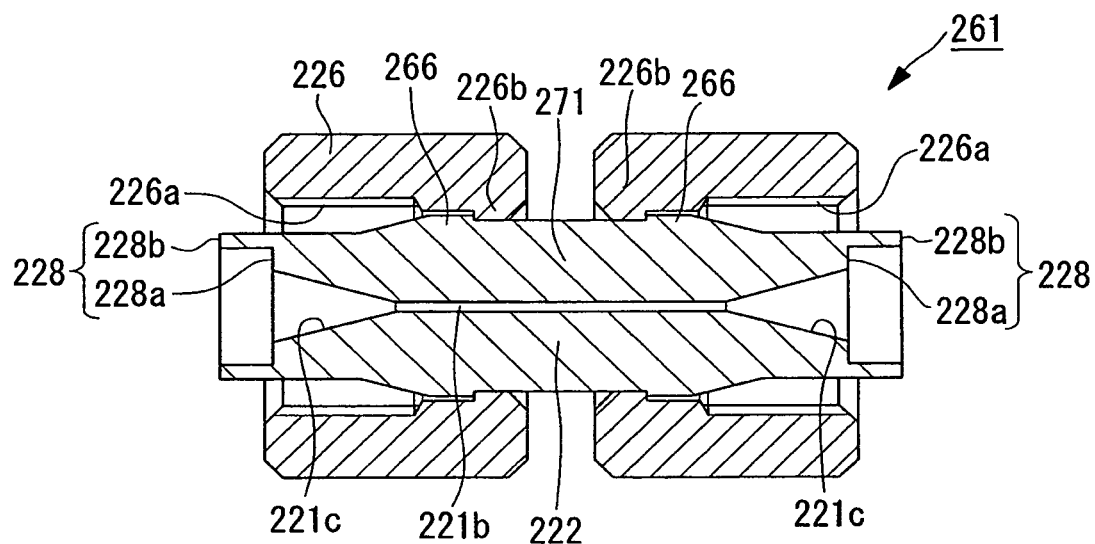
FIG. 20 is a longitudinal cross-sectional view illustrating the orifice unit of the flow-rate controller according to the third embodiment of the present invention.

A third embodiment of a flow-rate controller according to the present invention will be described with reference to FIGS. 19 and 20.

A flow-rate controller 260 according to this embodiment is structured such that instead of the orifice unit 13 in the flow-rate controller 10 according to the first embodiment, an orifice unit 261 that has a different connection structure for connecting to the regulator unit 11 and the valve unit 12 is used.

The members that are similar to or the same as those according to the above-described first embodiment are represented by the same reference numerals, and descriptions thereof are omitted.

The orifice unit 261 is structured such that instead of the tube portion 221 and the sleeve 227 in the orifice unit 13 according to the first embodiment, a tube portion 271 is used, the tube portion 271 being configured such that the end portion passed through nut 226 is rigid, a large-diameter portion 266 is provided on an outer circumferential surface of the end portion, and the engagement protrusion 226b of the nut 226 engages with the large-diameter portion 266.

At the end portion of the tube portion 271, similar to the sleeve 227 according to the first embodiment, the contact surface 228a and the cylindrical portion 228b, constituting the engagement portion 228, are integrated.

With the orifice unit 261, it is preferable to form at least one of the large-diameter portion 266 of the tube portion 271 and the engagement protrusion 226b of the nut 226 in a shape that allows the nut 226 to easily pass over the large-diameter portion 266 when the end of the tube portion 271 is inserted into the nut 226 and that reliably transmits the tightening force of the nut 226 to the large-diameter portion 266.

In this embodiment, the large-diameter portion 266 of the tube portion 271 is formed in a shape such that the diameter at the end of the tube portion 271 gradually decreases toward the tip, and the center area in the longitudinal direction of the tube portion 271 has a surface substantially orthogonal to the axis.

The engagement protrusion 226b of the nut 226 is formed in a shape such that the side having the female threaded portion 226a in the axial direction of the nut 226 has a surface substantially orthogonal to the axis, and the diameter of the side opposite to the female threaded portion 226a in the axial direction of the nut 226 gradually decreases away from the female threaded portion 226a in the axial direction.

With the flow-rate controller 260 having such a structure, the orifice unit 261 is connected to the regulator unit 11 and the valve unit 12 with the same process as that is used for the orifice unit 13 in the flow-rate controller 10 according to the first embodiment. The connection structure of the orifice unit 261 with the regulator unit 11 and the valve unit 12 is the same as the connection structure of the orifice unit 13 with the regulator unit 11 and the valve unit 12 according to the first embodiment.

With the flow-rate controller 260 having such a structure, in the orifice unit 261, since the tube portion and the joint structure are integrated, to connect the orifice unit 261 to the regulator unit 11 or the valve unit 12, a separate joint member, such as a sleeve, does not have to be installed between these units, making the connection operation easy.

Figure 21:
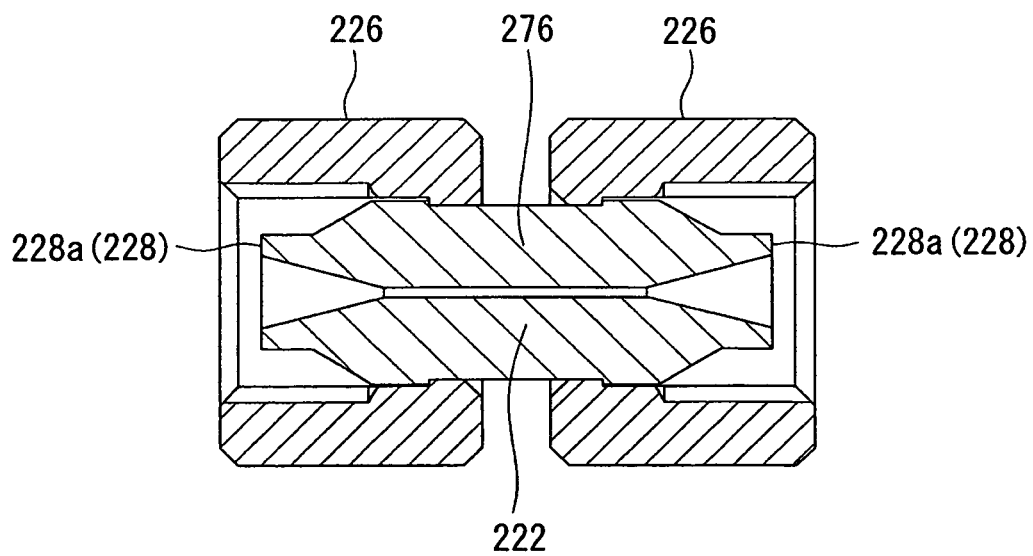
FIG. 21 is a longitudinal cross-sectional view illustrating another configuration example of the orifice unit of the flow-rate controller according to the third embodiment of the present invention.

In this embodiment, an example in which the tube portion 271 with the cylindrical portion 228b is integrated at the end portion has been described. However, the configuration is not limited thereto, and, as shown in FIG. 21, a tube portion 276 not having the cylindrical portion 228b may be used.

Figure 22:
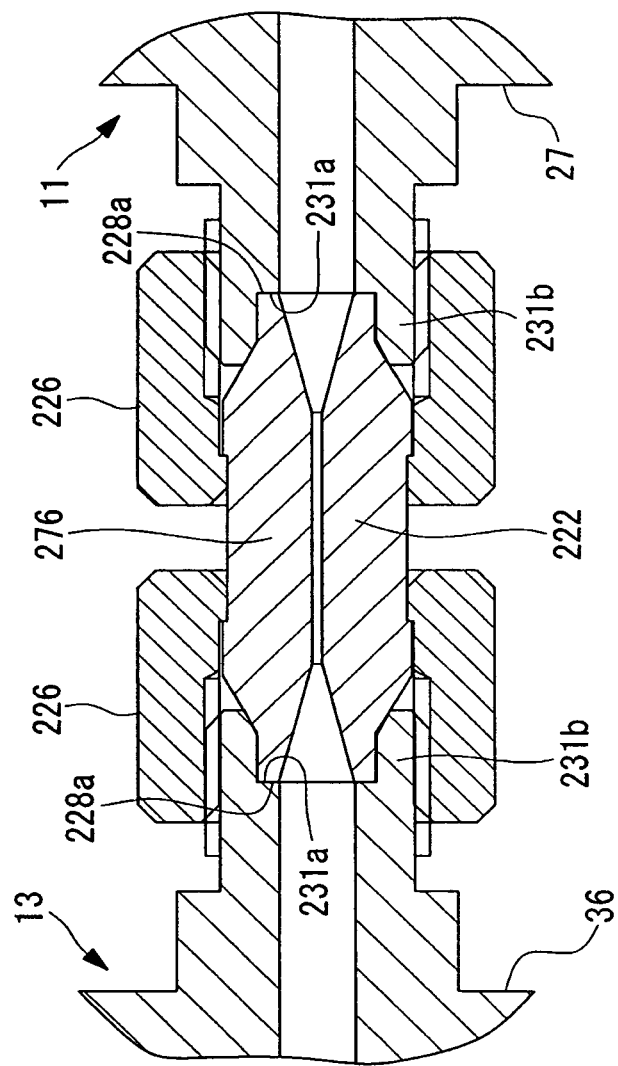
FIG. 22 is a longitudinal cross-sectional view illustrating another configuration example of the connection structure of an orifice unit and a regulator unit with the valve unit of the flow-rate controller according to the third embodiment of the present invention.

In this case, the joint structure 27 of the regulator unit 11 and the joint structure 36 of the valve unit 12 can be structured with the depressed portion 231c, as shown in FIG. 22.

Fourth Embodiment

A fourth embodiment of a flow-rate controller according to the present invention will be described with reference to FIG. 23.

A flow-rate controller 280 according to this embodiment is structured such that instead of the regulator unit 11, the valve unit 12, and the orifice unit 13 in the flow-rate controller 10 according to the first embodiment, a regulator unit 281, a valve unit 282, and an orifice unit 283 that have different connection structures for connecting the units are used.

The orifice unit 283 is structured such that the structure of the connection portions for the regulator unit 11 and the valve unit 12 in the orifice unit 13 according to the first embodiment are changed.

Figure 23:
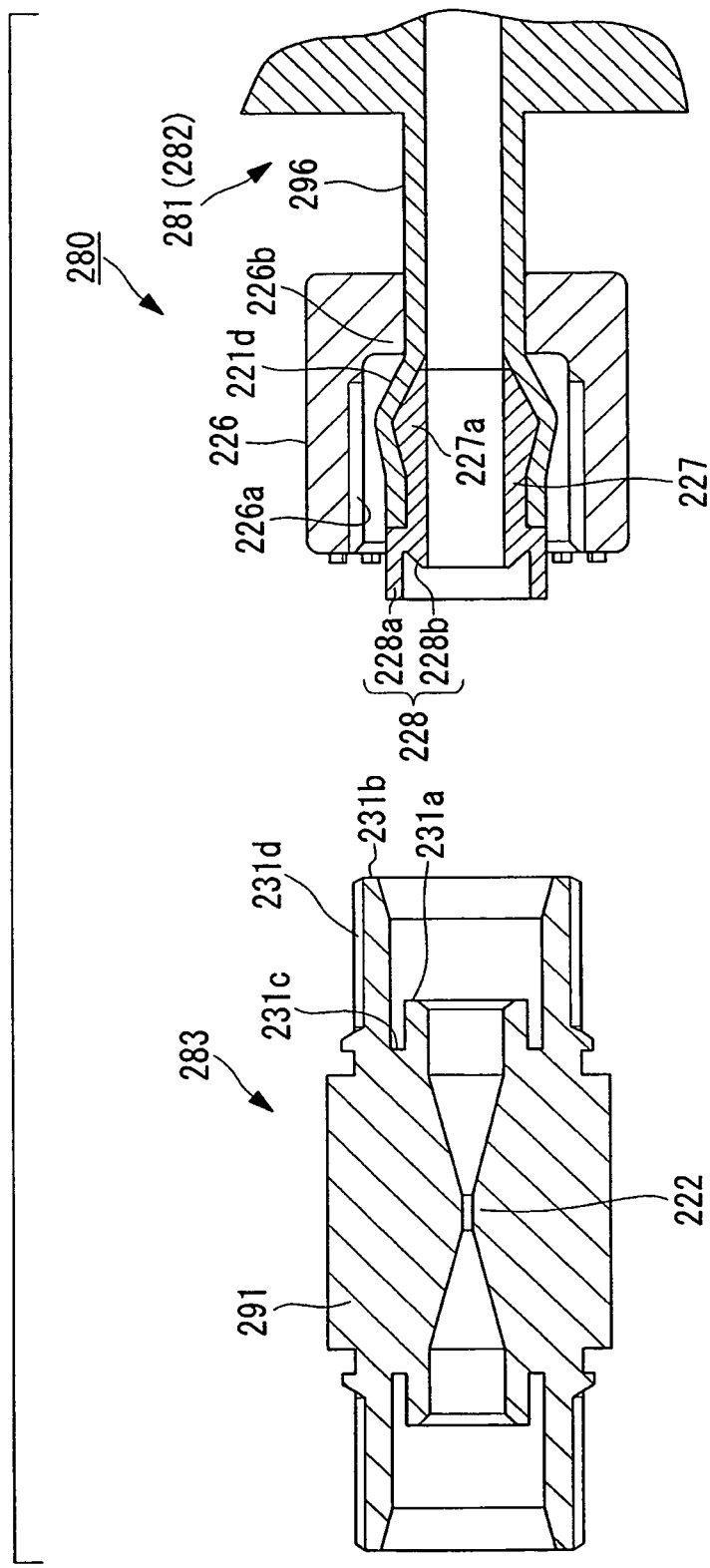
FIG. 23 is a longitudinal cross-sectional view illustrating the orifice unit of the flow-rate controller according to a fourth embodiment of the present invention.

More specifically, the orifice unit 283 is structured such that the nut 226 and the sleeve 227 in the orifice unit 13 according to the first embodiment are not provided and, instead of the tube portion 221, a tube portion 291 having the structure shown in FIG. 23 is used.

The tube portion 291 is structured such that, in the tube portion 221 according to the first embodiment, both ends are rigid, and each end includes a substantially ring-shaped contact surface 231a that surrounds the open end of the channel, a cylindrical portion 231b that protrudes in the axial direction farther than the contact surface 231a and that surrounds the contact surface 231a, and a ring-shaped depressed portion 231c that is provided between the contact surface 231a and the cylindrical portion 231b. A male threaded portion 231d is formed on the outer circumferential surface of the cylindrical portion 231b.

The regulator unit 281 and the valve unit 282 are structured such that instead of the contact surface 231a, the cylindrical portion 231b, the depressed portion 231c, and the male threaded portion 231d in the regulator unit 11 and the valve unit 12 according to the first embodiment, a tube portion 296 led out from a housing, a nut 226 though which the end of the tube portion 296 is passed, and a sleeve 227 that is inserted into the end of the tube portion 296 and that forms a large-diameter portion 221d at the end of the tube portion 296 by widening the section near the end of the tube portion 296 outwards in the radial direction are provided.

Here, similar to the first embodiment, the sleeve 227 includes an engagement portion 228 that is formed of a substantially ring-shaped contact surface 228a that surrounds the open end of the channel of the sleeve 227 and is in surface contact with the end surface of the joint structure of the regulator unit 11 or the valve unit 12, and a cylindrical portion 228b that protrudes father than the contact surface 228a and surrounds the contact surface 228a.

The regulator unit 281, the valve unit 282, and the orifice unit 283 of the flow-rate controller 280 having the above-described structure are connected by the same connection method as the connection method of the regulator unit 11, the valve unit 12, and the orifice unit 13 of the flow-rate controller 10 according to the first embodiment (but, the male and female connection structures are reversed).

Figure 24:
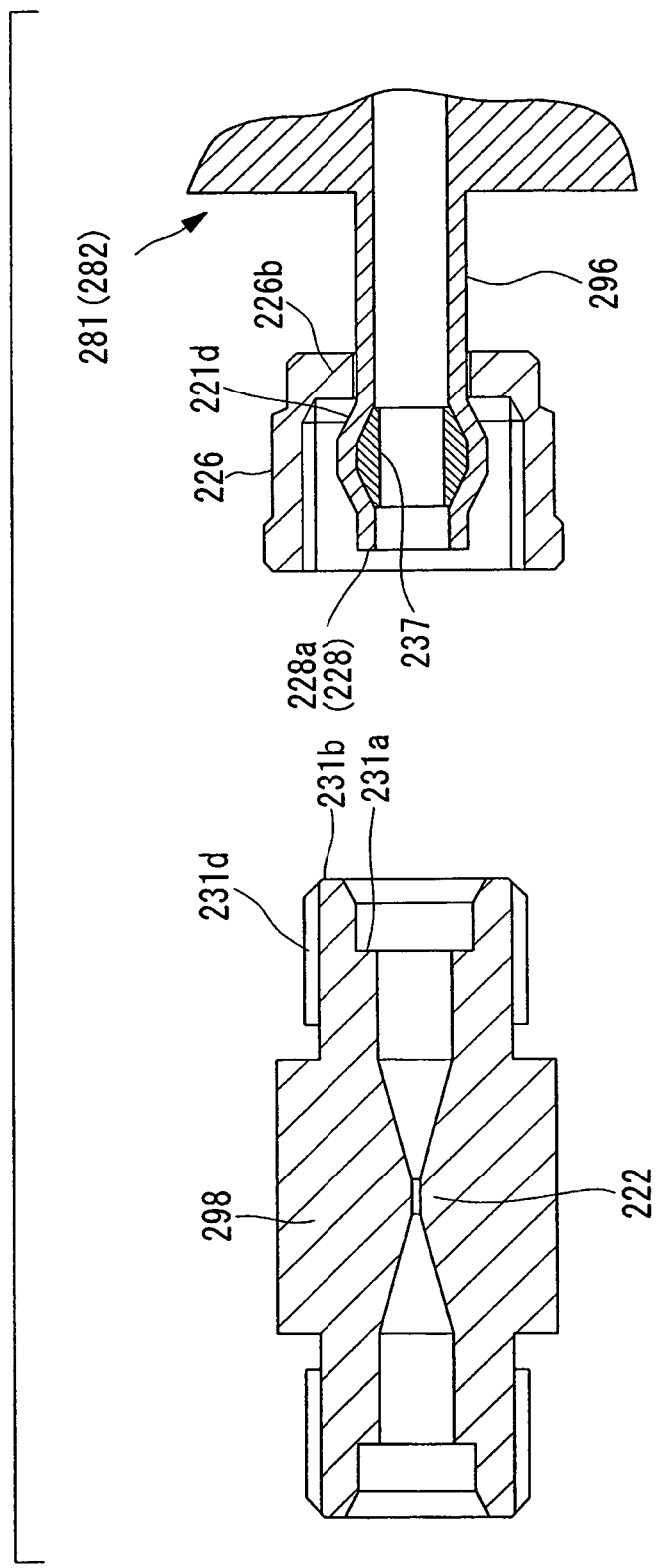
FIG. 24 is a longitudinal cross-sectional view illustrating another configuration example of the connection structure of the orifice unit and the regulator unit with the valve unit of the flow-rate controller according to the fourth embodiment of the present invention.

In this embodiment, as shown in FIG. 24, instead of the orifice unit 283 and the tube portion 291, a tube portion 298 having a structure in which the depressed portion 231c is removed from the tube portion 291 may be used.

In this case, on the regulator unit 281 and the valve unit 282, a large-diameter portion 221d is formed on the tube portion 296 by inserting a ring-shaped sleeve 237, which does not have the engagement portion 228, farther than the end of the tube portion 296. The engagement portion 228 is formed by the end of the tube portion 296 (but the cylindrical portion 228b is not provided and the end of the tube portion 296 functions as a contact surface 228a).

Figure 25:
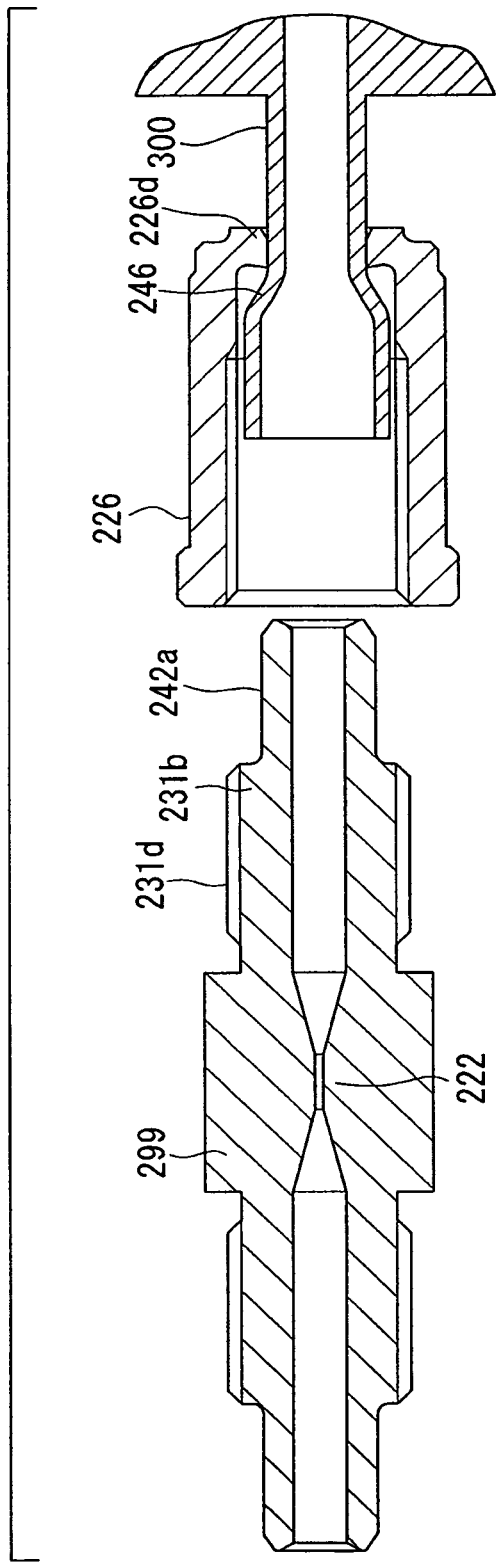
FIG. 25 is a longitudinal cross-sectional view illustrating another configuration example of the connection structure of the orifice unit and the regulator unit with the valve unit of the flow-rate controller according to the fourth embodiment of the present invention.

According to this embodiment, as shown in FIG. 25, the orifice unit 283 may include, instead of the tube portion 291, a tube portion 299 having a structure in which, in the tube portion 291, the contact surface 231a and the depressed portion 231c are not provided and an insertion portion 242a to be inserted into a large-diameter portion 246 of the tube portion 296 is provided at the tip of the cylindrical portion 231b.

In this case, in the valve unit 282 and the orifice unit 283, the sleeve 237 is not provided, and, instead of the tube portion 296, a tube portion 300 is provided, wherein the tube portion 300 has a structure in which, in the tube portion 296, the end is a large-diameter portion 246 that has flexibility, has a diameter larger than other portions, and internally accepts a connection end, which is described below, of the tube portion 291 of the orifice unit 283, and the engagement protrusion 226b of the nut 226 is engaged with the large-diameter portion 246.

Since the end of the tube portion 300 is flexible and deformable, it can be easily passed through the nut 226.

In the above-described embodiments, cases in which the connection structures at the ends of an orifice unit are male and female structures have been described. However, the connection structures are not limited thereto, and one end of the orifice unit may be a male connection structure and the other end may be a female connection structure.

The invention claimed is:

1. A flow-rate controller comprising:
    a regulator unit with a fluid channel having a first body provided on a first base, a regulator provided on the first body, and a first pressure detection device;
    a valve unit with a fluid channel having a second body provided on a second base, a flow-rate control valve provided on the second body, and a second pressure detection device; and
    an orifice unit that is connected to the regulator unit and the valve unit in a detachable manner and that has a fluid channel and an orifice that connect to the regulator unit and the valve unit,
    wherein the orifice unit includes,
        a tube portion constituting the fluid channel,
        an orifice integrally provided in the tube portion without a joint,
        a joint structure that directly connects an end of the tube portion to the regulator unit or the valve unit,
    wherein the orifice unit is not directly connected to any one of the first base and the second base,
    wherein the joint structure and the tube portion are integrated,
    wherein the first base includes a first fixing portion,
    wherein the second base includes a second fixing portion,
    wherein the first fixing portion and the second fixing portion are fixed to each other in a detachable manner, and
    wherein
    the valve unit further comprises a compression coil spring interposed between a sliding part and cover flange that is designed to urge the sliding part in a direction of fluid force acting on a diaphragm needle.

2. A flow-rate controller according to claim 1, wherein
    the first base has first bolt through-holes formed at an end portion which is an opposite side from a side of the first fixing portion; and
    the second base has second bolt through-holes formed at an end portion which is an opposite side from a side of the second fixing portion.

* * * * *

UNITED STATES PATENT AND TRADEMARK OFFICE
CERTIFICATE OF CORRECTION

PATENT NO. : 8,573,247 B2  Page 1 of 1
APPLICATION NO. : 11/989503
DATED : November 5, 2013
INVENTOR(S) : Ushigusa et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 928 days.

Signed and Sealed this
Twenty-second Day of September, 2015

Michelle K. Lee
*Director of the United States Patent and Trademark Office*